US011758578B2

(12) United States Patent
Yang et al.

(10) Patent No.: US 11,758,578 B2
(45) Date of Patent: Sep. 12, 2023

(54) RELEASING RESERVED RESOURCES FOR SIDELINK RESOURCE ALLOCATIONS

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/217,678

(22) Filed: Mar. 30, 2021

(65) Prior Publication Data

US 2022/0322363 A1 Oct. 6, 2022

(51) Int. Cl.
*H04W 72/02* (2009.01)
*H04W 72/56* (2023.01)
(Continued)

(52) U.S. Cl.
CPC .............. *H04W 72/56* (2023.01); *H04L 1/16* (2013.01); *H04W 72/20* (2023.01); *H04W 72/52* (2023.01)

(58) Field of Classification Search
CPC .... H04B 1/7143; H04W 28/26; H04W 72/02; H04W 72/0453; H04W 74/0808; H04W 74/0816; H04W 92/18; B60H 1/00507
See application file for complete search history.

(56) References Cited

U.S. PATENT DOCUMENTS

2020/0022089 A1* 1/2020 Guo .................... H04W 52/383
2020/0314916 A1* 10/2020 Park ........................ H04W 4/40
(Continued)

FOREIGN PATENT DOCUMENTS

WO WO-2020243966 A1 * 12/2020

OTHER PUBLICATIONS

Fraunhofer HHI, et al., "Resource Allocation Enhancements for Mode 2", 3GPP TSG RAN WG1 Meeting #102-e, 3GPP Draft, R1-2005537, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051914975, 8 Pages, Retrieved from the Internet: URL: https://ftp.3gpp.org/tsg_ran/WG1_RL1/TSGR1_102-e/Docs/R1-2005537.zip R1-2005537_SL_RA_M2enh.docx [retrieved on Aug. 7, 2020] Section 2.

(Continued)

*Primary Examiner* — Phuc H Tran
(74) *Attorney, Agent, or Firm* — Loza & Loza, LLP

(57) ABSTRACT

Improved resource allocation approaches for sidelink communication are provided. In an aspect, a first wireless device may reserve a first resource for a sidelink communication and second resources for retransmissions, respectively, of the sidelink communication, and may transmit the sidelink communication using the first resource. In response to determining to release the second resources, the first wireless device may transmit, to a second wireless device, a release indication indicating that the second resources are available. In an aspect, a wireless device may receive a first sidelink communication from a transmitting wireless device on a first resource, and may identify second resources reserved respectively for retransmissions of the first sidelink communication. In response to a determination that the second resources are available for a second sidelink communication, the wireless device may report the second resources to a higher layer within the wireless device for resource selection.

28 Claims, 20 Drawing Sheets

(51) Int. Cl.
H04L 1/16 (2023.01)
H04W 72/20 (2023.01)
H04W 72/52 (2023.01)

(56) References Cited

U.S. PATENT DOCUMENTS

2022/0209905 A1* 6/2022 Han .................. H04L 1/1887
2022/0264478 A1* 8/2022 Miao ................ H04W 52/325

OTHER PUBLICATIONS

International Search Report and Written Opinion—PCT/US2022/018166—ISA/EPO—dated Jun. 7, 2022.
ITRI: "Discussion on Enhancement for NR V2X Mode 2", 3GPPTSG RAN WG1 #103-e, 3GPP Draft, R1-2007878, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 20, 2020 (Oct. 20, 2020), XP051940697, 5 Pages, Retrieved from the Internet: URL: https://ftp.3gpp.org/tsg_ran/WG1_RL1/TSGR1_103-e/Docs/R1-2007878.zip R1-2007878.docx, [Retrieved on Oct. 20, 2020] section 2.2, p. 2, section 3 p. 3-p. 4, Figure 1 section 4, p. 5.
ITRI: "Enhancement of Mode 2 Latency Performance", 3GPP TSG RAN WG1 #103-e, 3GPP Draft, R1-2007880, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 20, 2020 (Oct. 20, 2020), XP051940699, 4 Pages, Retrieved from the Internet: URL: https://ftp.3gpp.org/tsg_ran/WG1_RL1/TSGR1_103-e/Docs/R1-2007880.zip R1-2007880.docx [retrieved on Oct. 20, 2020] the whole document.

* cited by examiner

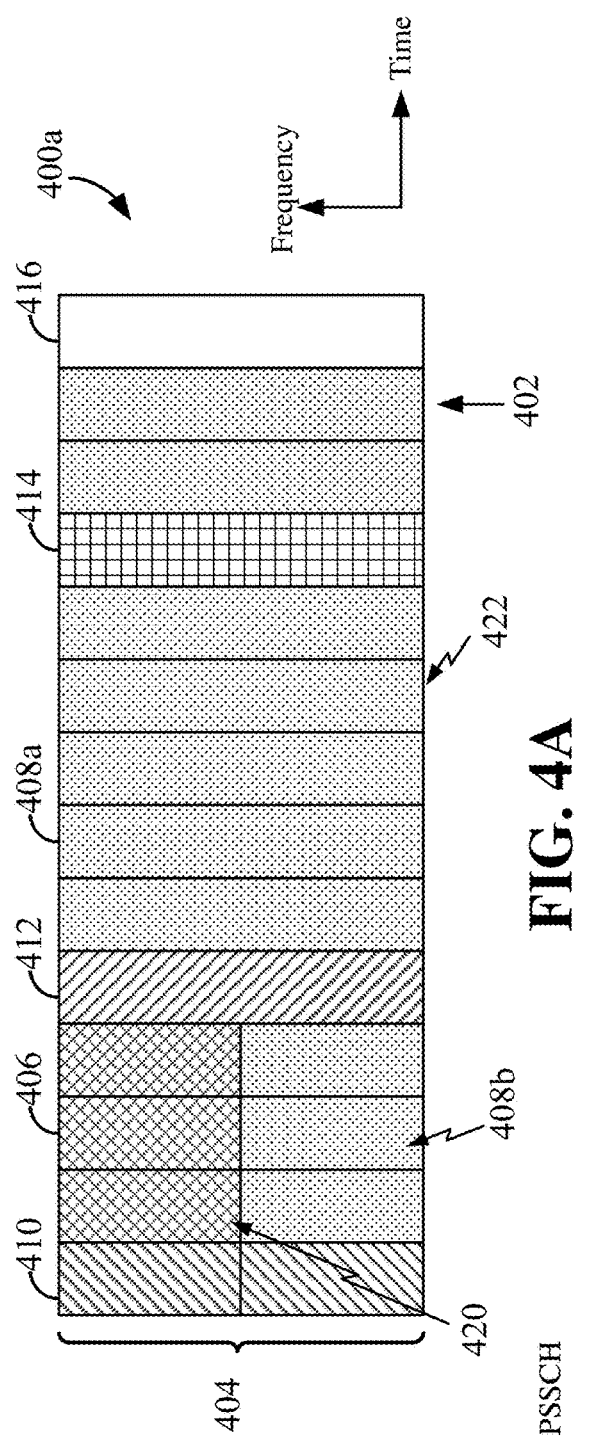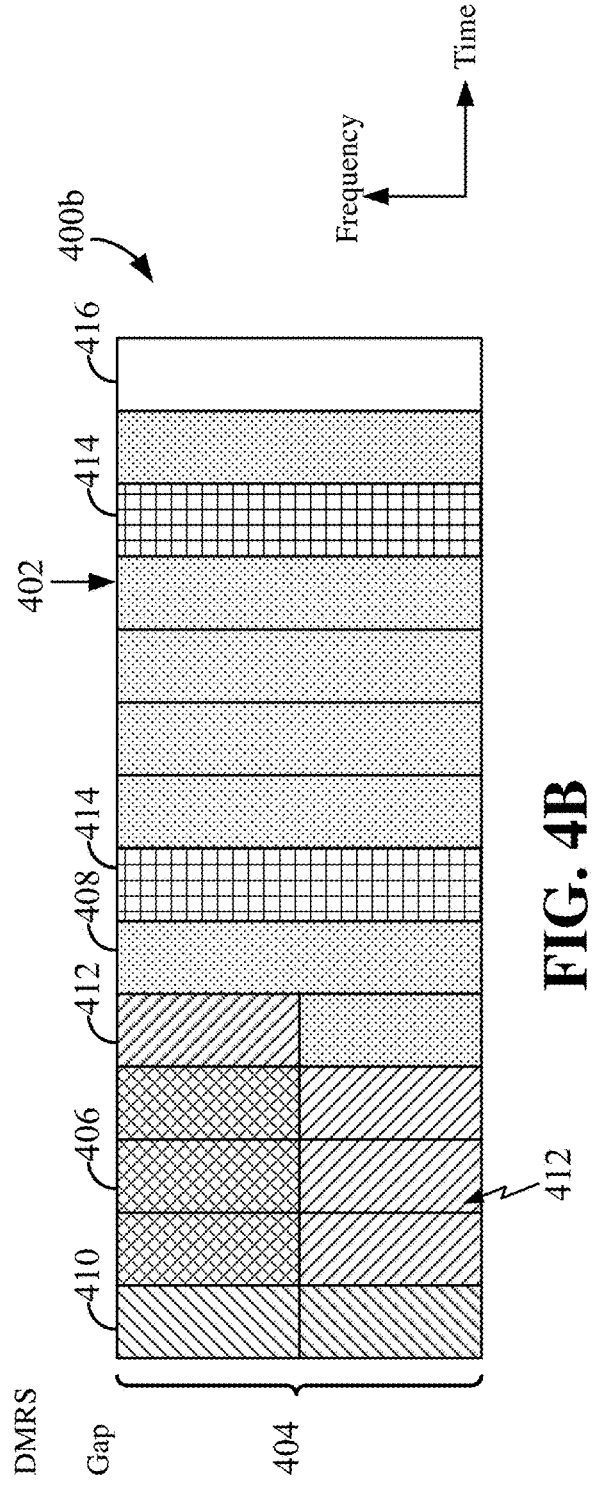
FIG. 4A
FIG. 4B

RELEASING RESERVED RESOURCES FOR SIDELINK RESOURCE ALLOCATIONS

TECHNICAL FIELD

The technology discussed below relates generally to wireless communication systems, and more particularly, to a sidelink resource allocation.

INTRODUCTION

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station. In some sidelink network configurations, wireless communication devices may configure communication resources autonomously and may transmit sidelink communications with each other without involving a base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a first wireless device is disclosed. The method includes reserving a first resource for a sidelink communication and one or more second resources for one or more retransmissions, respectively, of the sidelink communication, transmitting the sidelink communication using the first resource, and transmitting, to a second wireless device, a release indication indicating that the one or more second resources are available in response to determining to release the one or more second resources.

In another example, a first wireless device for wireless communication is disclosed. The first wireless device includes at least one processor, a transceiver communicatively coupled to the at least one processor, and a memory communicatively coupled to the at least one processor. The at least one processor may be configured to reserve a first resource for a sidelink communication and one or more second resources for one or more retransmissions, respectively, of the sidelink communication, transmit the sidelink communication using the first resource, and transmit, to a second wireless device, a release indication indicating that the one or more second resources are available in response to determining to release the one or more second resources.

In one example, a method of wireless communication by a wireless device is disclosed. The method includes receiving a first sidelink communication from a transmitting wireless device on a first resource, identifying one or more second resources reserved respectively for one or more retransmissions of the first sidelink communication, and reporting the one or more second resources to a higher layer within the wireless device for resource selection in response to a determination that the one or more second resources are available for a second sidelink communication.

In another example, a wireless device for wireless communication is disclosed. The wireless device includes at least one processor, a transceiver communicatively coupled to the at least one processor, and a memory communicatively coupled to the at least one processor. The at least one processor may be configured to receive a first sidelink communication from a transmitting wireless device on a first resource, identify one or more second resources reserved respectively for one or more retransmissions of the first sidelink communication, and report the one or more second resources to a higher layer within the wireless device for resource selection in response to a determination that the one or more second resources are available for a second sidelink communication.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
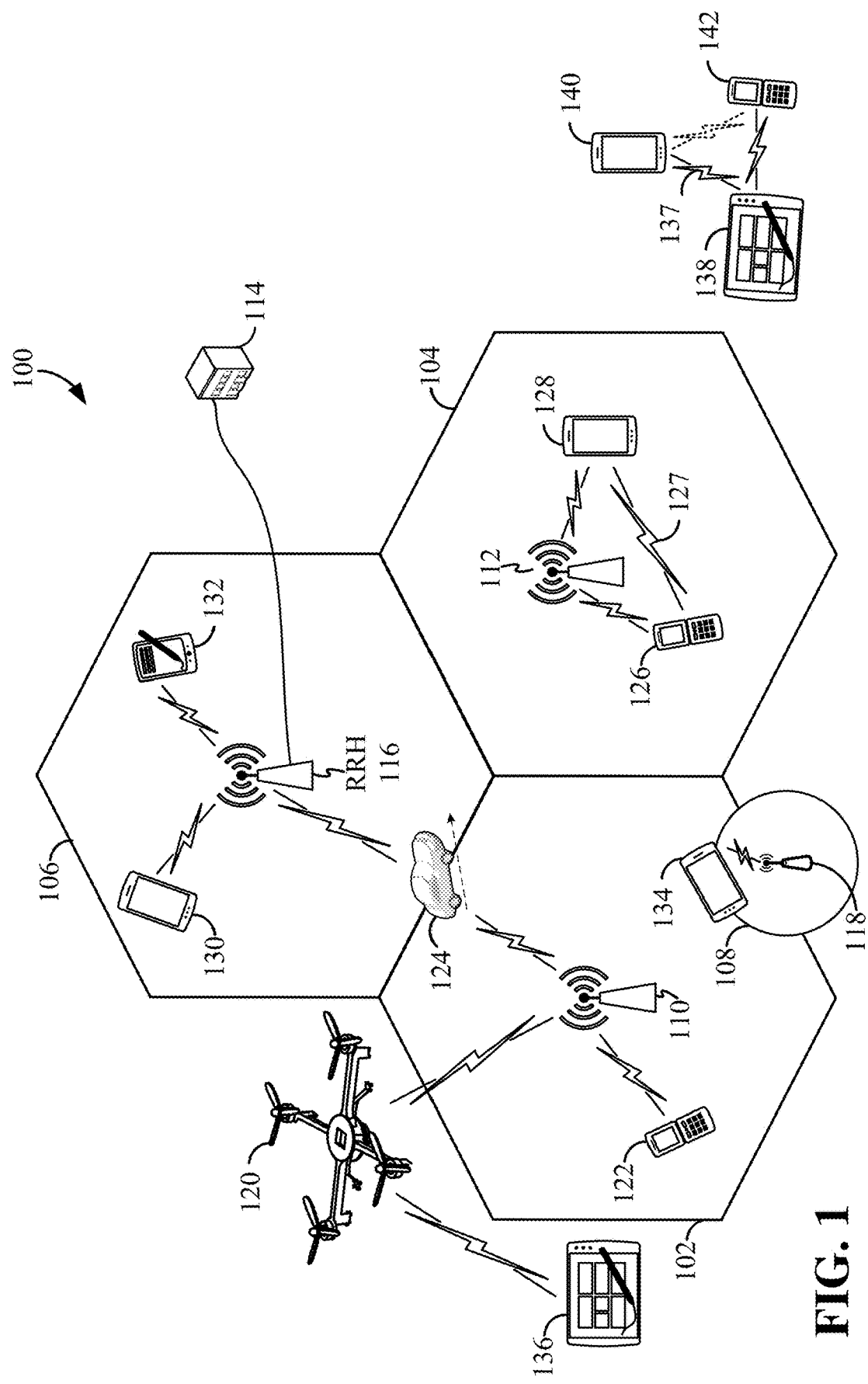
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a certain resource allocation mode for sidelink communications, wireless devices may autonomously select sidelink resources for sidelink communications between the wireless devices. A wireless device may reserve a resource for a sidelink communication and an additional resource for a retransmission of the sidelink communication. The additional resource reserved for the retransmission may not be used if the sidelink communication is successfully received by a receiving device. Therefore, the additional resource reserved for the retransmission for the sidelink transmission may be released to become available if the sidelink transmission is received successfully and/or the additional resource is reserved for a high priority communication by another device.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
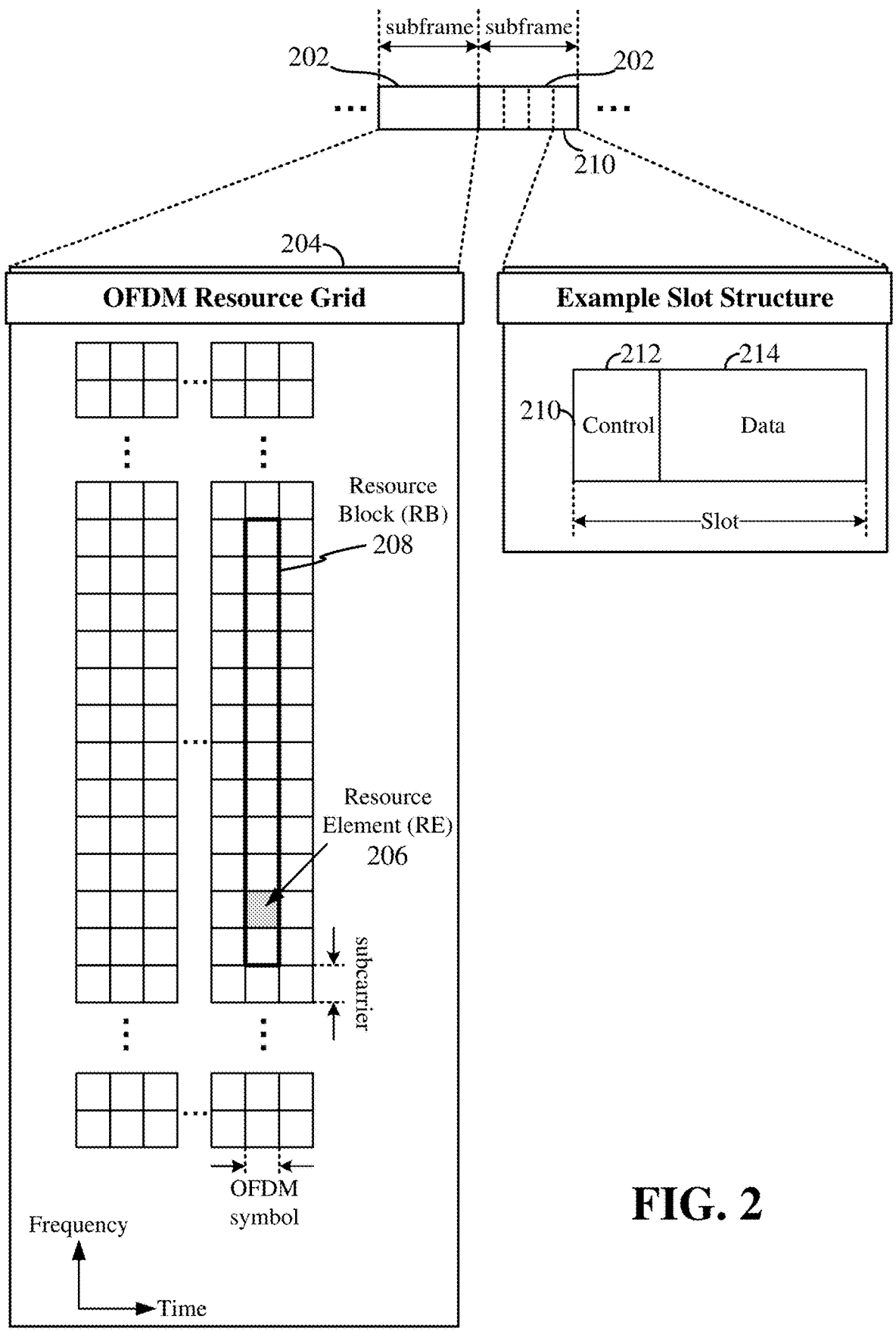
FIG. 2 is a schematic illustration of an organization of wireless resources in an air interface utilizing orthogonal frequency divisional multiplexing (OFDM) according to some embodiments.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
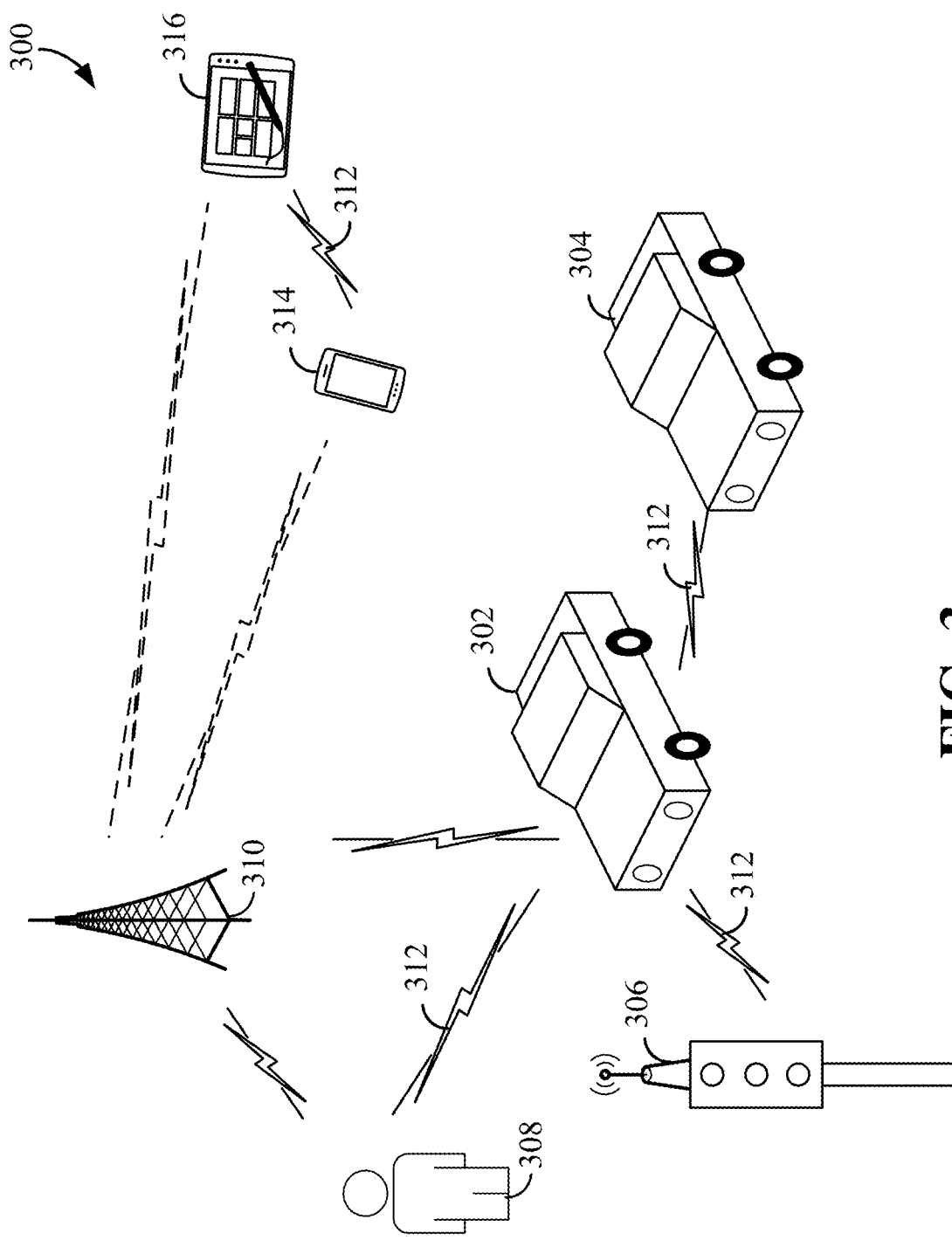
FIG. 3 illustrates an example of a wireless communication network 300 configured to support device-to-device (D2D) or sidelink communication.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/ or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. For example, the PSCCH 406 may span 10, 12, 14, 20, or 24 PRBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 246-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
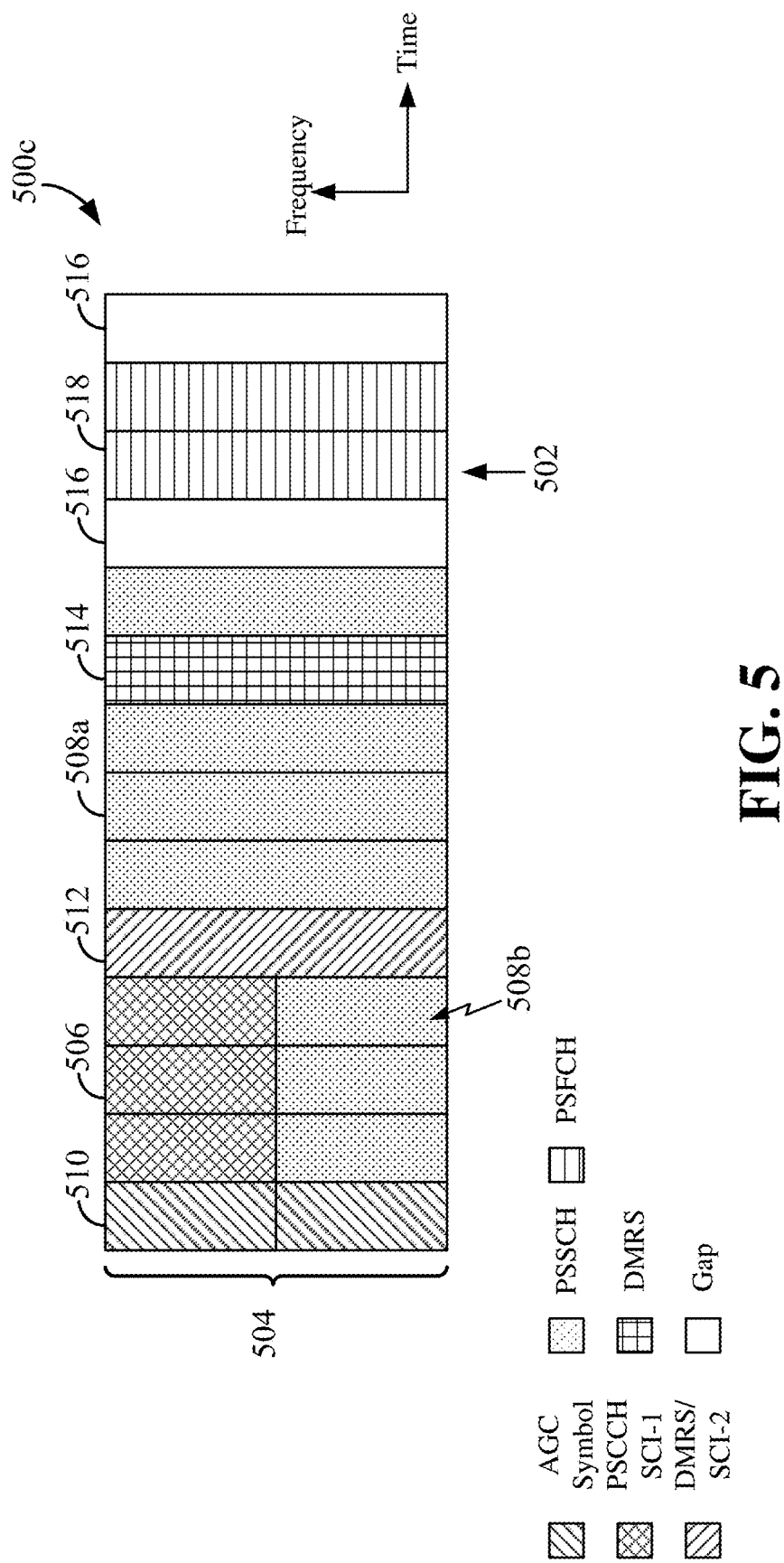
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include a DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500c. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

As discussed above, according to Mode 2, a wireless device may autonomously determine sidelink resources for transmissions without involving a base station. For example, the wireless device may determine the sidelink resources within sidelink resources configured by a base station and/or within pre-configured sidelink resources. In Mode 2, the UE may determine the sidelink resources by sensing and reserving resources.

In Mode 2, resources for sidelink communication may be allocated based on reservation of the resources by a wireless device. In an example, resources may be allocated in units of sub-channels in the frequency domain and each resource allocation may be limited to one slot in the time domain. The wireless device may reserve resources for a sidelink transmission in a current slot and may further reserve up to two future resources in up to two future slots, respectively. A wireless device transmitting a sidelink communication may transmit reservation information on the reserved resources via SCI. In an example, resources reservations may be done in a window of 32 logical slots.

In an aspect, the wireless device may reserve a resource for a sidelink transmission and may further reserve up to two future resources for up to two retransmission opportunities respectively of the sidelink transmission. Hence, if the sidelink transmission is not successfully communicated, the wireless device may utilize the reserved future resources for retransmissions of the sidelink transmission. If the retransmissions of the sidelink transmission are not successful, the wireless device may reserve additional future resources for additional retransmissions.

The resources may be reserved periodically or aperiodically in sidelink communications. In the aperiodic reservation, a wireless device may reserve (e.g., arbitrarily) a resource for a sidelink transmission and may further reserve future resources for retransmission opportunities respectively of the sidelink transmission. In the periodic reservation, a wireless device may reserve a resource for a sidelink transmission as well as future resources for retransmission opportunities of the sidelink transmission, and the reservations of these resources may be repeated periodically. In an example, the periodic reservation of the resources may be used for periodic sidelink communications. For example, a time period between two adjacent periodic resource reservations may be a configurable value between 0 ms and 1000 ms, which may be communicated via SCI. In an example, the periodic reservation of the resources may be disabled by a configuration indicating to disable the periodic reservation.

Figure 6A:
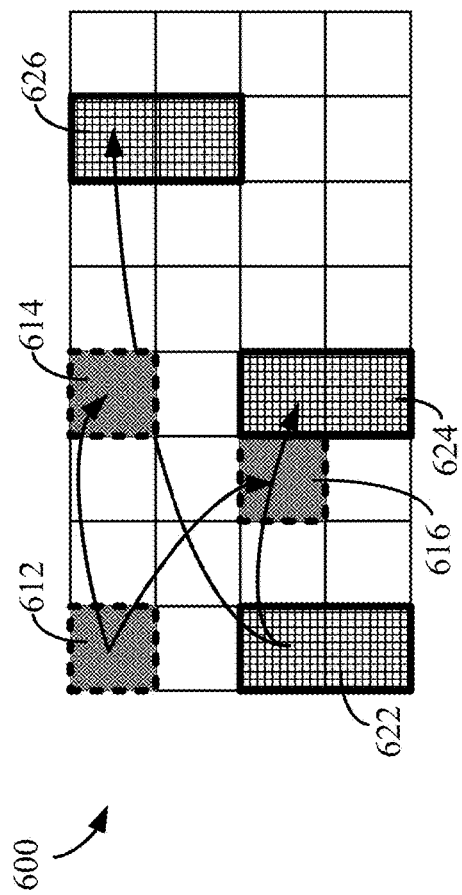
FIG. 6A is an example diagram illustrating an aperiodic reservation of resources for sidelink communications, according to some aspects.
Figure 6B:
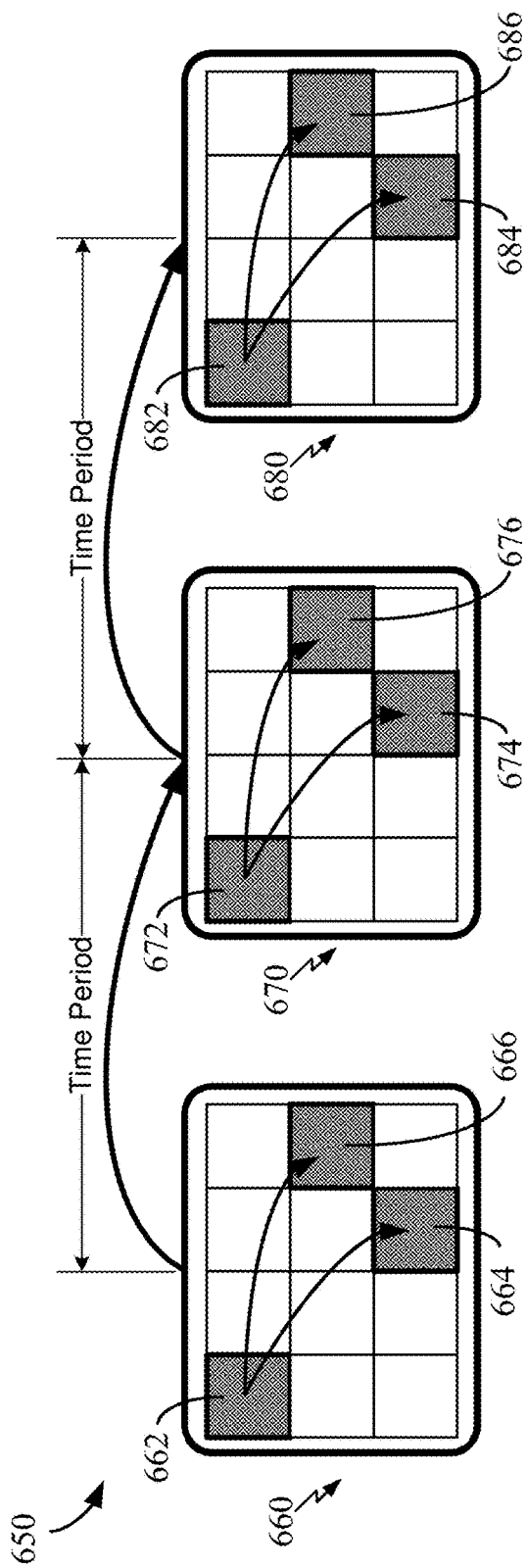
FIG. 6B is an example diagram illustrating a periodic reservation of resources for sidelink communications, according to some aspects.

FIG. 6A is an example diagram 600 illustrating an aperiodic reservation of resources for sidelink communications, according to some aspects. In FIG. 6A, a wireless device reserves a resource 612 for a first sidelink transmission, and further reserves two future resources 614 and 616 respectively for two retransmissions of the first sidelink transmission. Further, in FIG. 6A, the wireless device reserves resources 622 for a second sidelink transmission and further reserves two sets of future resources 624 and 626 respectively for two retransmissions of the second sidelink transmission. FIG. 6B is an example diagram 650 illustrating a periodic reservation of resources for sidelink communications, according to some aspects. In FIG. 6B, the reservation of resources at a first instance 660 may be periodically repeated at a second instance 670 and a third instance 680, where two adjacent instances are separated by a time period. At the first instance 660, a wireless device reserves a resource 662 for a first sidelink transmission, and further reserves two future resources 664 and 666 respectively for two retransmissions of the first sidelink transmission. At the second instance 670, the wireless device reserves a resource 672 for a first sidelink transmission, and further reserves two future resources 674 and 676 respectively for two retransmissions of the first sidelink transmission. At the third instance 680, the wireless device reserves a resource 682 for a first sidelink transmission, and further reserves two future resources 684 and 686 respectively for two retransmissions of the first sidelink transmission. The locations of the resources 662, 664, and 666 may be the same as the locations of the resources 672, 674, and 676 respectively, and may be offset by the time period. Further, the locations of the resources 672, 674, and 676 may be the same as the locations of the resources 682, 684, and 686 respectively, and may be offset by the time period.

As discussed above, for example, the resources for transmitting the sidelink communication may be PSSCH resources, and HARQ feedback associated with the sidelink communication may be received on a PSFCH resource that may be identified based on the PSSCH resource used to transmit the sidelink communication.

Figure 7:
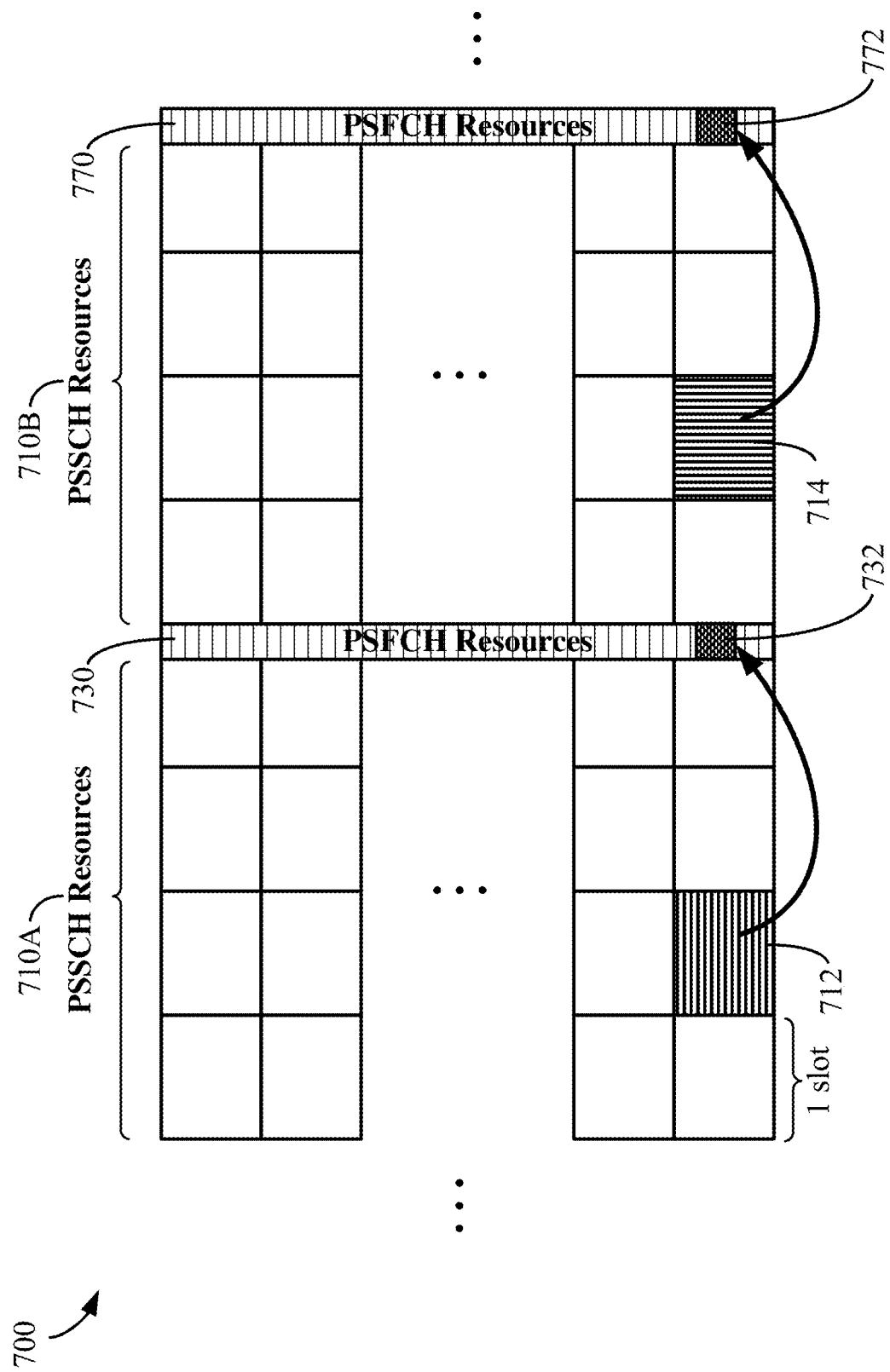
FIG. 7 is an example diagram illustrating a sidelink communication on a PSSCH resource and HARQ feedback on a PSFCH resource, according to some aspects.

FIG. 7 is an example diagram 700 illustrating a sidelink communication on a PSSCH resource and HARQ feedback on a PSFCH resource, according to some aspects. FIG. 7 shows PSSCH resources 710A and 710B, where PSFCH resources 730 exist at the end of the PSSCH resources 710A and PSFCH resources 770 exist at the end of the PSSCH resources 710B. Hence, in the example shown in FIG. 7, PSFCH resources may exist at the end of every 4 slots of PSSCH resources. In FIG. 7, a wireless device reserved a PSSCH resource 712 for a sidelink communication and a PSSCH resource 714 for a retransmission of the sidelink communication. A PSFCH resource 732 of the PSFCH resources 730 is associated with the PSSCH resource 712, and thus HARQ feedback of a sidelink communication on the PSSCH resource 712 may be received on the PSFCH resource 732. Further, a PSFCH resource 772 of the PSFCH resources 770 is associated with the PSSCH resource 714, and thus HARQ feedback of a sidelink communication on the PSSCH resource 714 may be received on the PSFCH resource 772.

If the wireless device transmits the sidelink communication on the PSSCH resource 712, the wireless device may receive HARQ feedback (e.g., an ACK response or a NACK response) on the PSFCH resource 732 in response to the sidelink communication. If the wireless device receives an ACK response on the PSFCH resource 732, the wireless device may not retransmit the sidelink communication on the PSSCH resource 714, and thus the PSSCH resource 714 is not used. If the wireless device receives a NACK response on the PSFCH resource 732, the wireless device may retransmit the sidelink communication on the PSSCH resource 714. In response to the retransmission on the PSSCH resource 714, the wireless device may receive HARQ feedback (e.g., an ACK response or a NACK response) on the PSFCH resource 732.

Figure 8:
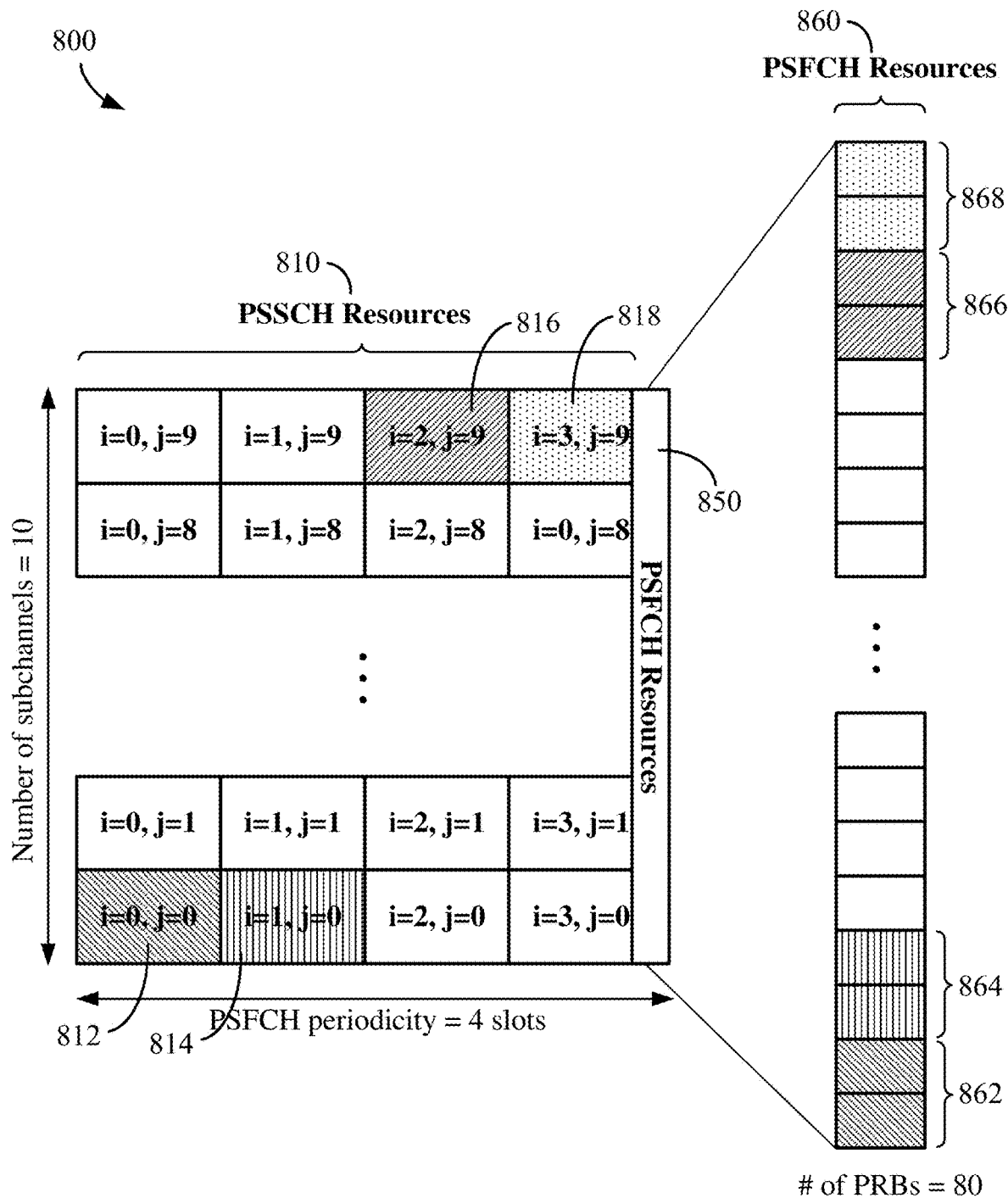
FIG. 8 is an example diagram illustrating structures of PSSCH resources and PSFCH resources, according to some aspect.

FIG. 8 is an example diagram 800 illustrating structures of PSSCH resources and PSFCH resources, according to some aspect. In FIG. 8, PSSCH resources 810 span over 10 subchannels and 4 slots, and thus the number of PSSCH resources 810 is 40. Each of the PSSCH resources 810 may be represented by a respective PSSCH resource index, which can be expressed as (i,j), where i ranges from 0 to 3 due to 4 slots and j ranges from 0 to 9 due to 10 subchannels. PSFCH resources 860 may exist at the end of the last slot of the PSSCH resources 810. The PSFCH resources 860 may include 80 PRBs. Each of the PSSCH resources 810 may be mapped to a corresponding set of PRBs of the PSFCH resources 860, and in FIG. 8, each set of PRBs of the PSFCH resources 860 includes two PRBs. Hence, for example, PSSCH resources 812, 814, 816, and 818 are mapped to PRBs 862, 864, 866, and 868 of the PSFCH resource s860, respectively. When a transmitting wireless device transmits a sidelink communication on a PSSCH resource, HARQ feedback associated with the sidelink communication may be received on a PRB of a set of PRBs of the PSFCH resources that correspond to the PSSCH resource. For example, if the transmitting wireless device transmits a sidelink communication on the PSSCH resource 812, HARQ feedback associated with the sidelink communication may be received on at least one of the PRBs 862 of the PSFCH resources 860.

For example, the first wireless device may allocate PRBs of the PSFCH based on the PRB indices $[(i+j \cdot N_{PSSCH}^{PSFCH}) \cdot M_{subch,slot}^{PSFCH}, \; (i+1+j \cdot N_{PSSCH}^{PSFCH}) \cdot M_{subch,slot}^{PSFCH} - 1]$ that map to respective PSSCH indices (subchannel i, slot j), where i ranges from 0 to $N_{subch}-1$ and j ranges from $N_{PSSCH}^{PSFCH}-1$. $N_{subch}$ is a number of subchannels of the PSSCH resources and $N_{PSSCH}^{PSFCH}$ is a number of slots (e.g., PSFCH periodicity) of the PSSCH resources that may be mapped to respective PRBs of the PSFCH. $M_{PRB,set}^{PSFCH}$ is a total number of PRBs per PSFCH resource set, $M_{subch,slot}^{PSFCH}=M_{PRB,set}^{PSFCH}/(N_{PSSCH}^{PSFCH}*N_{subch})$, and $0 \le i \le N_{PSSCH}^{PSFCH}$ and $0 \le j \le N_{subch}$. In the example FIG. 8, $N_{PSSCH}^{PSFCH}=4$, $N_{subch}=10$, and $M_{subch,slot}^{PSFCH}=80/(4*10)=2$.

As discussed above, the current resource reserved for a sidelink communication and the future resources are reserved for retransmissions of the sidelink communication by a transmitting wireless device. In this scenario, if the sidelink communication is successfully received by a receiving wireless device (e.g., in a unicast transmission), the reserved future resources will not be used for retransmission of the sidelink communication. Because wireless devices other than the transmitting wireless device may not utilize the future resources reserved by the transmitting wireless device, these future resources may be wasted if these future resources are not used by the transmitting wireless device. Referring back to FIG. 6A, for example, if the first sidelink communication transmitted on the resource 612 is successfully received by a receiving wireless device, the resources 614 and 616 reserved for retransmissions of the first sidelink communication may not be used and thus may be wasted. For example, if a success rate of sidelink communications is high, a lot of resources reserved for retransmissions may not be used and thus may be wasted.

According to some aspects of the disclosure, a first wireless device may release a reserved resource that the first wireless device has previously reserved by transmitting a resource release indication indicating that the reserved resource is available. For example, the first wireless device may reserve a first resource for a sidelink communication and one or more second resources for one or more retransmissions, respectively, of the sidelink communication. The first wireless device may transmit the sidelink communication using the first resource. If the first wireless device determines to release the one or more second resources, the first wireless device may transmit a release indication to a second wireless device, where the release indication indicates that the one or more second resources are available. The resource release indication may be transmitted via unicast, groupcast, and/or broadcast. When the second wireless device (e.g., utilizing the same resource pool as the transmitting wireless device) receives the resource release indication indicating that the one or more second resources are available, the second wireless device may report the one or more second resources to a higher layer within the second wireless device for resource selection. For example, after reporting the one or more second resources to the higher layer of the second wireless device, the second wireless device may select the one or more second resources and may utilize the one or more second resources for transmitting a communication. In an example, the higher layer may be a Layer 2 or a MAC layer.

Figure 9:
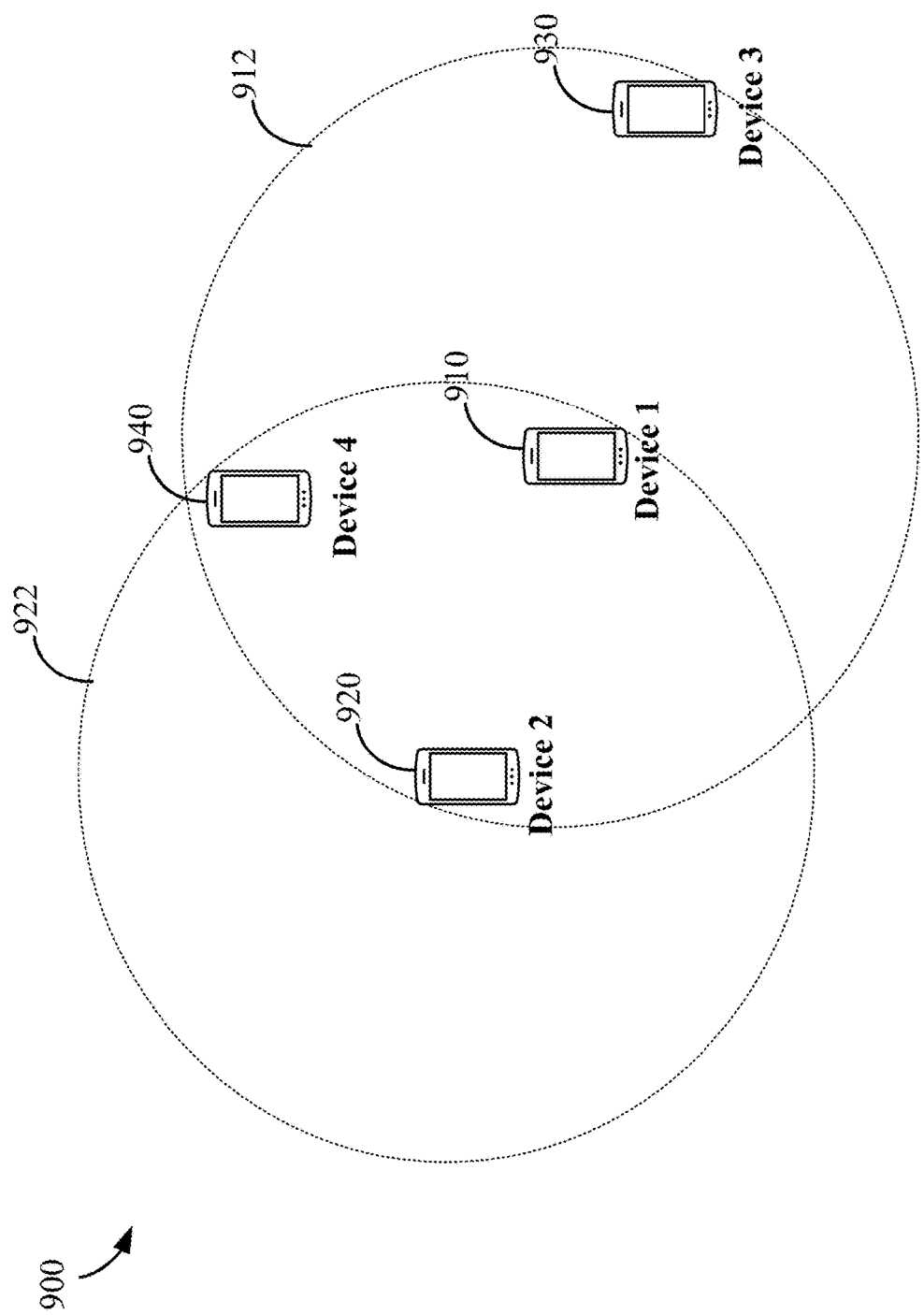
FIG. 9 is an example diagram illustrating interactions between wireless devices via sidelink, according to some aspects.

FIG. 9 is an example diagram 900 illustrating interactions between wireless devices via sidelink, according to some aspects. In FIG. 9, a first wireless device 910 having a communication range 912 may reserve a first resource for a sidelink communication and a second resource for a retransmission of the sidelink communication. The first wireless device 910 may transmit the sidelink communication to a second wireless device 920 having a communication range 922. The first wireless device 910 may determine to release the second resource reserved for a retransmission of the sidelink communication. When the first wireless device 910 determines to release the second resource, then the first wireless device 910 may transmit a release indication indicating that the second resource is available. In an aspect, the first wireless device 910 may transmit the release indication to the second wireless device 920, via unicast, such that the second wireless device 920 may utilize the second resource after determining that the second resource is available based on the release indication. In another aspect, the first wireless device 910 may transmit the release indication to the second wireless device 920, a third wireless device 930, a fourth wireless device 940, via groupcast, or broadcast, such that any of the second wireless device 920, the third wireless device 930, and the fourth wireless device 940 may utilize the second resource after determining that the second resource is available based on the release indication. In FIG. 9, the second wireless device 920, the third wireless device 930, and the fourth wireless device 940 are within the communication range 912 of the first wireless device 910 and thus may share the same resource pool as the first wireless device 910.

In an aspect, the first wireless device may release the one or more second resources when the first wireless device receives an ACK message (e.g., from the second wireless device) for the sidelink communication. For example, when the second wireless device successfully receives the sidelink communication, the second wireless device may transmit the ACK message to the first wireless device. Because the ACK message indicates that the sidelink communication has been received successfully, the first wireless device may not utilize the one or more second resources to retransmit the sidelink communication. Therefore, the ACK message may trigger releasing of the one or more second resources reserved for the retransmission of the sidelink communication.

Figure 10A:
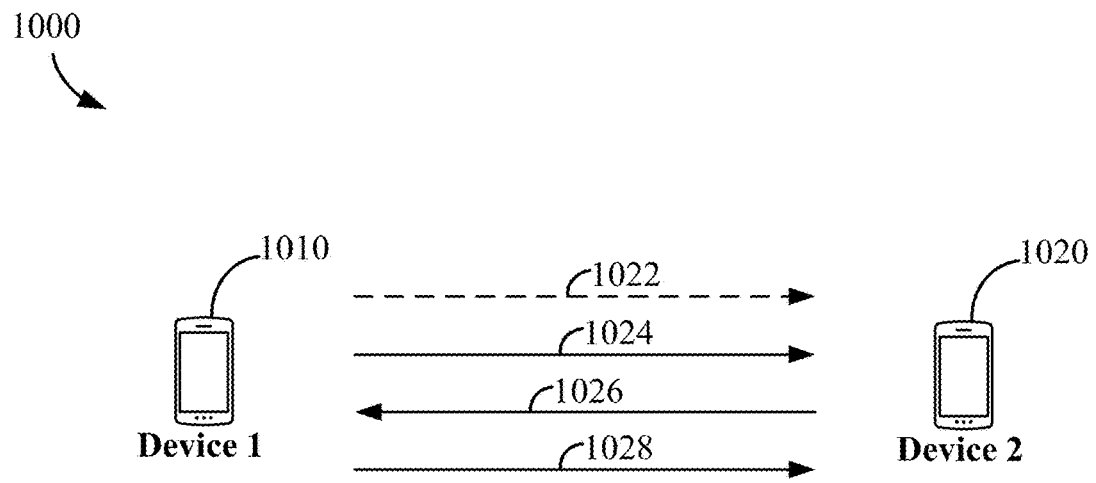
FIGS. 10A and 10B are example diagrams illustrating a release of a resource reserved for a retransmission of a sidelink communication in response to an acknowledgement message, according to some aspects.
Figure 10B:
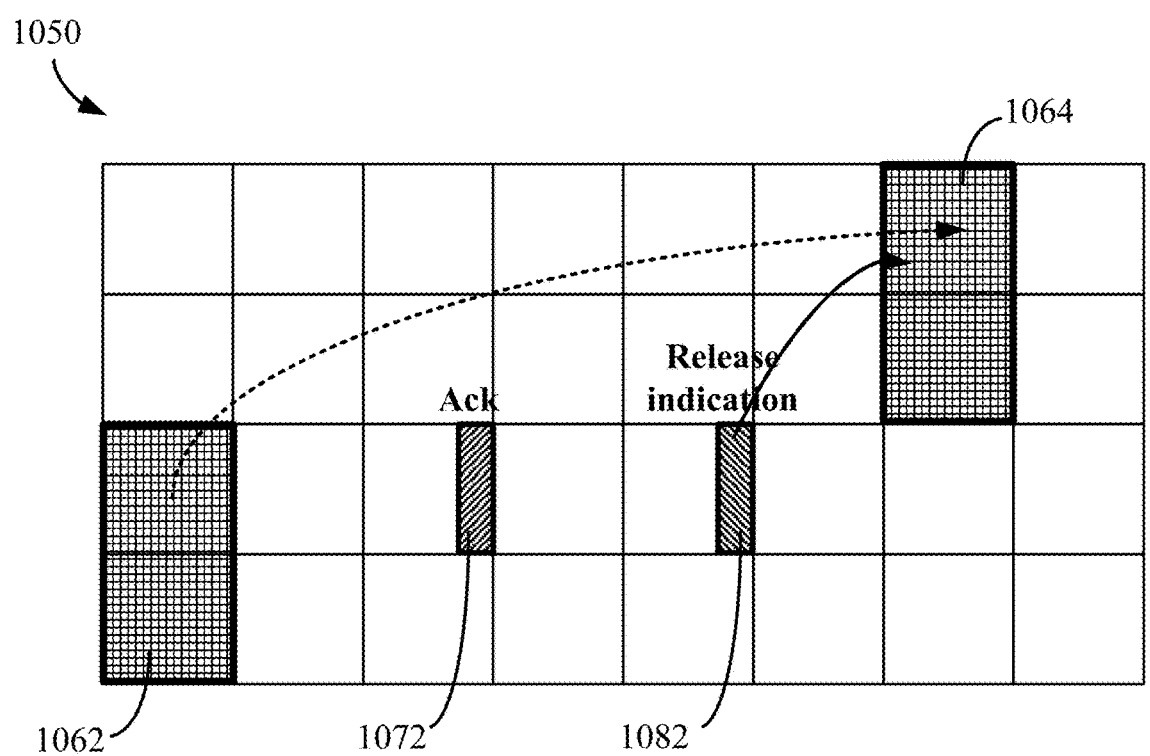

FIGS. 10A and 10B are example diagrams illustrating a release of a resource reserved for a retransmission of a sidelink communication in response to an acknowledgement message, according to some aspects. FIG. 10A is an example diagram 1000 illustrating interactions between two wireless devices to release a resource reserved for a retransmission of a sidelink communication in response to an acknowledgement message, according to some aspects. FIG. 10B is an example diagram 1050 illustrating resources for the interactions between the two wireless devices of FIG. 10A. The first wireless device 1010 may reserve a first resource 1062 for a sidelink communication and a second resource 1064 for a retransmission of the sidelink communication. At 1022, the first wireless device 1010 may transmit an indication of the reservation of resources including the first resource and the second resources. At 1024, the first wireless device 1010 may transmit the sidelink communication on the first resource 1062 to a second wireless device 1020. If the second wireless device 1020 determines that the sidelink communication has been successfully received, at 1026, the second wireless device 1020 may transmit an ACK message on a resource 1072 to the first wireless device 1010. In response to receiving the ACK message, at 1028, the first wireless device 1010 may release the second resource 1064 and transmit a release indication on a resource 1082 to indicate that the second resource 1064 is available. The release indication may be transmitted via unicast to the second wireless device 1020 or may be transmitted to multiple wireless devices including the second wireless device 1020 via groupcast or broadcast.

In an aspect, the first wireless device may release the one or more second resources when the first wireless device receives a priority indication indicating that another wireless device has reserved the one or more second resources for a communication with a higher priority than the sidelink communication. For example, the second device may also reserve the second resource for a second sidelink communication. In an example where a first UE reserved a resource for a low priority communication (e.g., downloading movies), if a second UE who has a high priority communication (e.g., urgent communication such as public safety message) to transmit, the second UE may transmit the priority indication indicating the high priority level of the high priority communication, such that the resource reserved by the first UE may be released to become available for the high priority communication by the second UE. For example, urgent communications such as public safety messages and delay-sensitive communications such as voice calls or video calls may have a higher priority level than communications such as downloading data (e.g., downloading music or movies).

In one scenario, a third wireless device different from the first and second wireless devices may not receive the priority indication from the second wireless device because the third wireless device is outside of a communication range of the second wireless device. In this scenario, if the third wireless device is able to receive the release indication from the first wireless device, the third wireless device may be able to utilize the one or more second resources because the third wireless device has not received the priority indication from the second wireless device. The third wireless device may be able to utilize the one or more second resources without interfering with the second sidelink communication by the second wireless device because the third wireless device is outside of the communication range of the second wireless device.

For example, referring back to FIG. 9, the second wireless device 920 may transmit a priority indication indicating that the second resource has been reserved for a communication with a high priority level. The priority indication may be transmitted via broadcast. If the high priority level of the communication based on the priority indication indicates a higher priority than the sidelink communication, then the first wireless device 910 may release the second resource and transmit the release indication indicating that the second resource is available to the second wireless device 920, the third wireless device 930, and the fourth wireless device 940. The third wireless device 930 of FIG. 9 may not receive the priority indication from the second wireless device 920 because the third wireless device 930 is outside the communication range 922 of the second wireless device 920. Hence, when the third wireless device 930 receives the release indication indicating that the second resource is available from the first wireless device 910, the third wireless device 930 may still utilize the second resource without interfering with the communication on the second resource by the second wireless device 920. This is possible because the third wireless device 930 is outside of the communication range 922 of the second wireless device 920.

On the other hand, for example, the fourth wireless device 940 is within the communication range 922 of the second wireless device 920 and thus may receive the priority indication from the second wireless device 920. Hence, the fourth wireless device 940 may not utilize the second resource based on the priority indication from the second wireless device 920, even after receiving the release indication from the first wireless device 910.

Figure 11A:
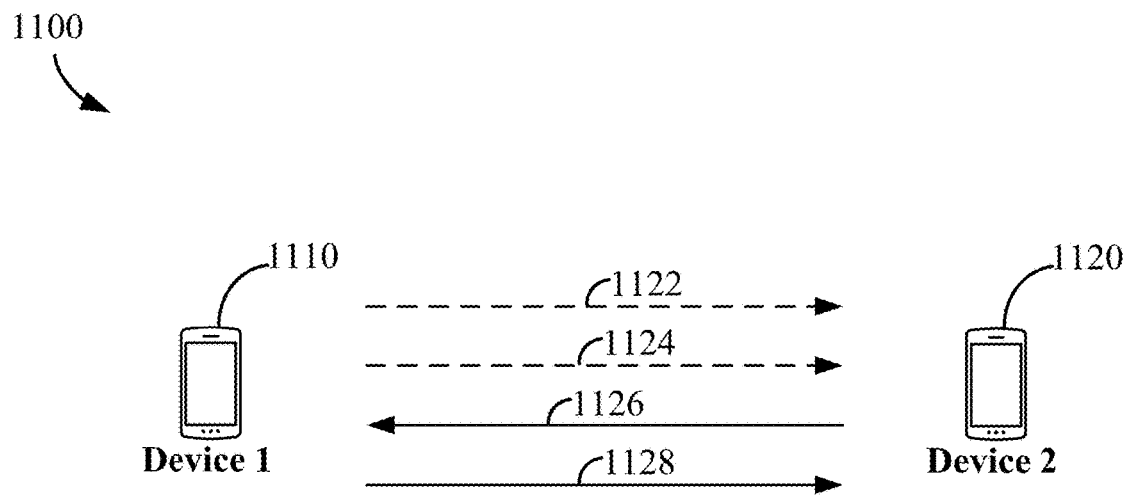
FIGS. 11A and 11B are example diagrams illustrating a release of a resource reserved for a retransmission of a sidelink communication in response to a priority indication, according to some aspects.
Figure 11B:
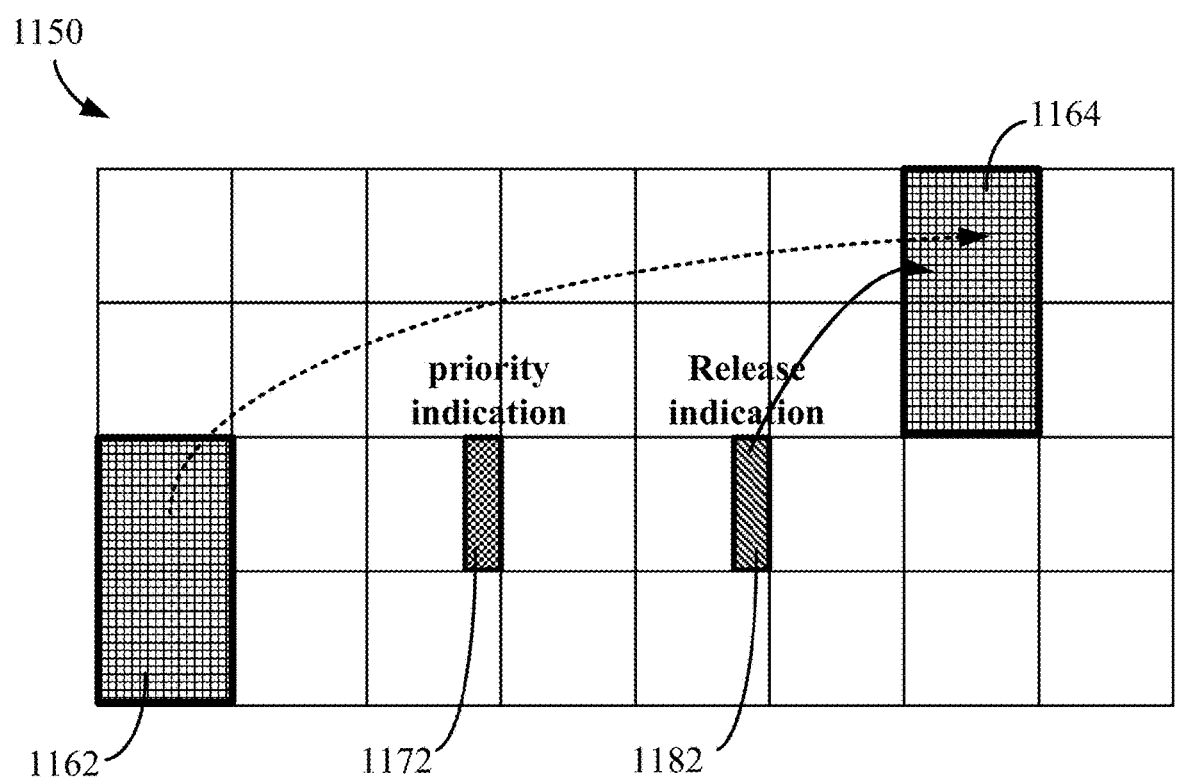

FIGS. 11A and 11B are example diagrams illustrating a release of a resource reserved for a retransmission of a sidelink communication in response to a priority indication, according to some aspects. FIG. 11A is an example diagram 1100 illustrating interactions between two wireless devices to release a resource reserved for a retransmission of a sidelink communication in response to a priority indication, according to some aspects. FIG. 11B is an example diagram 1150 illustrating resources for the interactions between the two wireless devices of FIG. 11A. The first wireless device 1110 may reserve a first resource 1162 for a sidelink communication and a second resource 1164 for a retransmission of the sidelink communication. At 1122, the first wireless device 1110 may transmit an indication of the reservation of resources including the first resource and the second resources. At 1124, the first wireless device 1110 may transmit the sidelink communication on the first resource 1162 to a second wireless device 1120. If the second wireless device 1120 has reserved the second resource 1164 for a second sidelink communication, at 1126, the second wireless device 1120 may transmit a priority indication to the first wireless device 1110 on a resource 1172, indicating a priority level of the second sidelink communication. When the first wireless device 1110 receives the priority indication, the first wireless device 1110 may determine whether the priority level of the second sidelink communication for which the second resource 1164 is reserved by the second wireless device 1120 is higher than a priority level of the first sidelink communication. If the first wireless device 1110 determines that the priority level of the second sidelink communication is higher than the priority level of the first sidelink communication based on the priority indication, at 1128, the first wireless device 1110 may release the second resource 1164 and transmit a release indication on a resource 1182 to indicate that the second resource 1164 is available. The release indication may be transmitted via unicast to the second wireless device 1120 or may be transmitted to multiple wireless devices including the second wireless device 1120 via groupcast or broadcast.

In an example, the second wireless device 1120 may start using the second resource to transmit the second sidelink communication, regardless of whether the second wireless device 1120 has received the release indication or after receiving the release indication. In an example, when a third wireless device different from the first wireless device 1110 and the second wireless device 1120 receives the release indication, the third wireless may use the second resource to transmit the second sidelink communication.

The release indication may include one or more of the following parameters. In an aspect, the release indication may include an indication that the one or more second resources are released. In an aspect, the release indication may include a source identifier associated with the first wireless device releasing the one or more second resources. For example, for a wireless device to utilize the second resource, other wireless devices utilizing the resource pool of the wireless device may not utilize the second resource (e.g., by releasing the second resource). For example, referring back to FIG. 9, if both the second wireless device 920 and the third wireless device 930 within the communication range 912 of the first wireless device 910 have reserved the second resource, the first wireless device 910 may utilize the second resource when the first wireless device 910 receives release indications of the second resource from both the second wireless device 920 and the third wireless device 930. Based on the source identifier of the second wireless device 920 in the release indication from the second wireless device 920 and the source identifier of the third wireless device 930 in the release indication from the third wireless device 930, the first wireless device 910 may determine that the second resource is released by both the second wireless device 920 and the third wireless device 930 and is available.

In an aspect, the release indication may include one or more triggers for releasing the one or more second resources. The one or more triggers may indicate, for example, at least one of the acknowledgement message or the priority indication. For example, if a monitoring wireless device monitoring a communication between the first wireless device and the second wireless device detects a release indication including an indication that a second resource is released as well as a trigger indicating the acknowledgement message, then the monitoring wireless device may utilize the second resource. On the other hand, for example, if the monitoring wireless device detects a release indication including the indication that the second resource is released as well as a trigger indicating the priority indication, then the monitoring wireless device may not utilize the second resource because the second resource may be used for a high priority communication indicated by the priority indication. In an aspect, the release indication may include an indication indicating that the one or more second resources being released is for a periodic reservation, or for an aperiodic reservation, or for both the periodic reservation and the aperiodic reservation.

Continuously transmitting the release indication by the first wireless device may incur a large power consumption at the first wireless device. Similarly, continuously monitoring by a receiving wireless device (e.g., second wireless device) for the release indication may incur a large power consumption at the receiving wireless device. Hence, according to an aspect, the first wireless device may determine whether to transmit the release indication based on a channel congestion level surrounding the first wireless device (e.g., congestion level of the first wireless device's resource pool). In an aspect, the channel congestion level may be a channel busy ratio (CBR), which may represent a percentage of resources recently utilized, e.g., by all UEs in the neighborhood of the first wireless device.

In an aspect, after determining a channel congestion level (e.g., a CBR) associated with resources for wireless communication, the first wireless device may release the one or more second resources if the channel congestion level is greater than a first congestion threshold, and thus may transmit the release indication. For example, the channel congestion level being greater than the first congestion threshold may indicate that the channel surrounding the first wireless device is congested and few resources are available, and thus the one or more second resources that may not be used by the first wireless device may be released for use by other wireless devices. If the channel congestion level is less than or equal to a second congestion threshold, the first wireless device may not release the one or more second resource, and thus may not transmit the release indication. For example, the channel congestion level being less than or equal to the second congestion threshold may indicate that many resources are available for wireless communication and thus releasing the one or more second resources may not be necessary.

In an aspect, the first congestion threshold may be the same as the second congestion threshold. In an example, the first threshold may be a congestion level of 33%. In another aspect, the first congestion threshold may be greater than the second congestion threshold. In this aspect, if the channel congestion level is greater than the second congestion threshold and less than or equal to the first congestion threshold, the first wireless device may randomly select between releasing the one or more second resources and not releasing the one or more second resources. In this aspect, a probability for the random selection for releasing the one or more second resources may be assigned based on a channel congestion level. For example, for a higher channel congestion level, a higher probability for the random selection for releasing the one or more second resources may be assigned.

Further, in an aspect, the second wireless device may determine whether to monitor for the release indication based on a channel congestion level (e.g., CBR) surrounding the second wireless device (e.g., congestion level of the second wireless device's resource pool). In an aspect, after determining a channel congestion level associated with resources for wireless communication, the second wireless device may monitor for the release indication if the channel congestion level is greater than a first congestion threshold. If the channel congestion level is less than or equal to a second congestion threshold, the second wireless device may not monitor for the release indication. This may be, for example, because the first wireless device may not transmit the release indication when the channel congestion level is low and/or because the channel congestion level being less than or equal to the second congestion threshold may indicate that sufficient resources are available for the second wireless device to carry out a successful communication even without resources released by the first wireless device via the release indication.

In an aspect, the first congestion threshold may be the same as the second congestion threshold. In another aspect, the first congestion threshold may be greater than the second congestion threshold. In this aspect, if the channel congestion level is greater than the second congestion threshold and less than or equal to the first congestion threshold, the first wireless device may randomly select between monitoring for the release indication and not monitoring for the release indication. In this aspect, a probability for the random selection for monitoring for the release indication may be assigned based on a channel congestion level. For example, for a higher channel congestion level, a higher probability for the random selection for monitoring for the release indication may be assigned.

In an aspect, a release indication resource may be allocated/configured (e.g., periodically) for transmitting the release indication for releasing the one or more second resources, where the release indication resource may be associated with the first resource for transmitting a sidelink communication. The first resource may be a reserved PSSCH resource out of multiple PSSCH resources, where each of the multiple resources corresponds to a respective release indication resource of multiple release indication resources. Hence, in this example, the PSSCH resource and its corresponding release indication resource may be allocated in similar manner to the allocation of a PSSCH resource and its corresponding PSFCH resource. Further, in an aspect, the first resource may be a reserved PSCCH resource out of multiple PSCCH resources, where each of the multiple resources corresponds to a respective release indication resource of multiple release indication resources. The PSCCH resource may be utilized to transmit an SCI.

Figure 12:
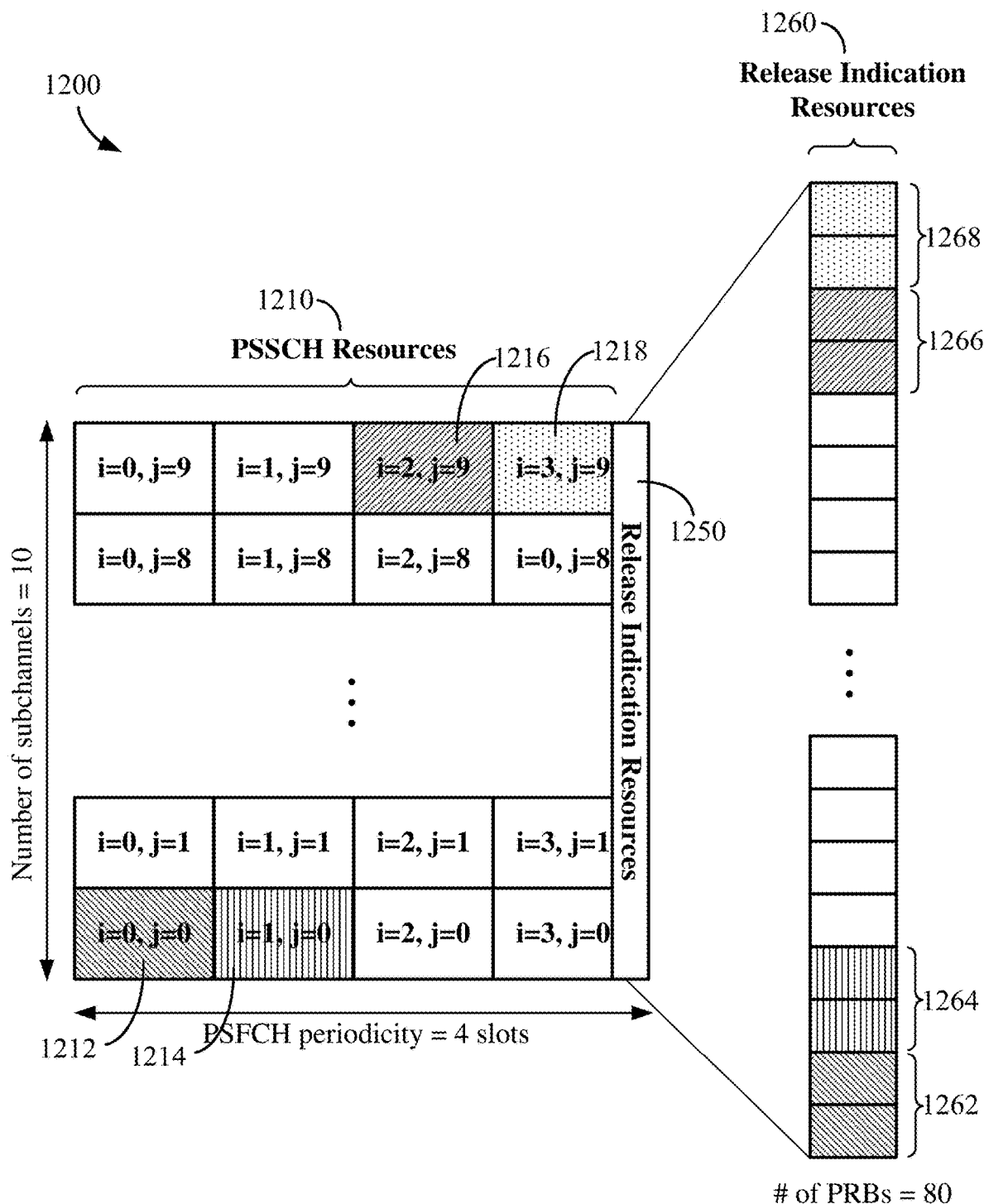
FIG. 12 is an example diagram illustrating structures of PSSCH resources and release indication resources for transmitting a release indication, according to some aspect.

FIG. 12 is an example diagram 1200 illustrating structures of PSSCH resources and release indication resources for transmitting a release indication, according to some aspects. In FIG. 12, PSSCH resources 1210 span over 10 subchannels and 4 slots, and thus the number of PSSCH resources 1210 is 40. Each of the PSSCH resources 1210 may be represented by a respective PSSCH resource index, which can be expressed as (i,j), where i ranges from 0 to 3 due to 4 slots and j ranges from 0 to 9 due to 10 subchannels. Release indication resources 1260 may exist at the end of the last slot of the PSSCH resources 1210, where a portion of the release indication resources 1260 may be used to transmit a release indication depending on which PSSCH resource of the PSSCH resources 1210 is reserved for a sidelink communication. The release indication resources 1260 may include 80 PRBs. Each of the PSSCH resources 1210 may be mapped to a corresponding set of PRBs of the release indication resources 1260, and in FIG. 12, each set of PRBs of the release indication resources 1260 includes two PRBs. Hence, for example, PSSCH resources 1212, 1214, 1216, and 1218 are mapped to PRBs 1262, 1264, 1266, and 1268 of the release indication resources 1260, respectively.

In an example, a transmitting wireless device may reserve a first PSSCH resource for a sidelink communication and a second PSSCH resource for a retransmission of the sidelink communication. The transmitting device may identify a set of PRBs of the release indication resources that corresponds to the first PSSCH resource, and transmit the release indication using the identified set of PRBs of the release indication resources. For example, if the transmitting wireless device reserves the PSSCH resource 1212 for transmitting a sidelink communication, the release indication for a second PSSCH resource (not shown in FIG. 12) for retransmission of the sidelink communication may be received on at least one of the PRBs 1262 of the release indication resources 1260.

In an aspect, the release indication resource for sending the release indication may also be associated with the source identifier of the first wireless device. In an aspect, the release indication resource for sending the release indication may also be associated with the destination identifier of the second wireless device (e.g., destination device of the sidelink communication) for a unicast communication or may be associated with a group identifier for a group of multiple wireless devices for a groupcast communication.

The first wireless device may transmit a sidelink grant that may include resource reservation information indicating that the one or more second resources are reserved by the first wireless device. The sidelink grant may be transmitted on a PSCCH resource, which may correspond to a release indication resource, as discussed above. The resource reservation information may further indicate that the first resource is reserved by the first wireless device. In an aspect, a monitoring wireless device (e.g., third wireless device) that is monitoring communications between the first wireless device and the second wireless device may monitor a PSCCH resource for the sidelink grant. The monitoring wireless device may further monitor a release indication resource for a corresponding release indication for the one or more second resources indicated by the sidelink grant, where the release indication resource may be identified from the PSCCH resource. Subsequently, the monitoring wireless device may determine the availability of the one or more second resources. For example, if the monitoring wireless device detects no release indication on the release indication resource, the monitoring wireless device may determine that the one or more second resources are not released and thus are not available. On the other hand, if the monitoring wireless device detects the release indication on the release indication resource indicating that the one or more second resources are available, the monitoring wireless device may determine that the one or more second resources are available.

According to some aspects of the disclosure, resources for retransmission of a sidelink communication may be released without transmitting a release indication. As discussed above, the first wireless device may reserve a first resource for a sidelink communication and a second resource for a retransmission of sidelink communication, and may transmit the sidelink communication to the second wireless device using the first resource. The first resource may be a PSSCH resource. A monitoring wireless device (e.g., third wireless device) may monitor the communication between the first wireless device and the second wireless device. In an aspect, the monitoring wireless device may monitor the first resource and thus receive the first sidelink communication on the first resource, and further may monitor for HARQ feedback from the second wireless device in response to the first sidelink communication. The monitoring wireless device may monitor a PSFCH resource for the HARQ feedback. If the monitoring wireless device detects/receives an ACK message transmitted from the second wireless device to the first wireless device in response to the first sidelink communication, the monitoring wireless device may determine that the second resource that was reserved for the retransmission of the first sidelink communication is available and thus may use the second resource to perform another sidelink communication by the monitoring wireless device.

In an aspect, if the second wireless device determines that the first sidelink communication from the first wireless device is successfully received, the second wireless device may transmit an ACK message to the first wireless device. If the second wireless device determines that the first sidelink communication from the first wireless device is successfully received (e.g., and thus transmits the ACK message), the second wireless device may utilize the second resource that was reserved for a retransmission of the first sidelink communication. For example, the second wireless device may assume that the second resource will not be used by the first wireless device for a retransmission of the first sidelink communication if the first sidelink communication is successfully received (e.g., decoded) by the second wireless device.

Figure 13:
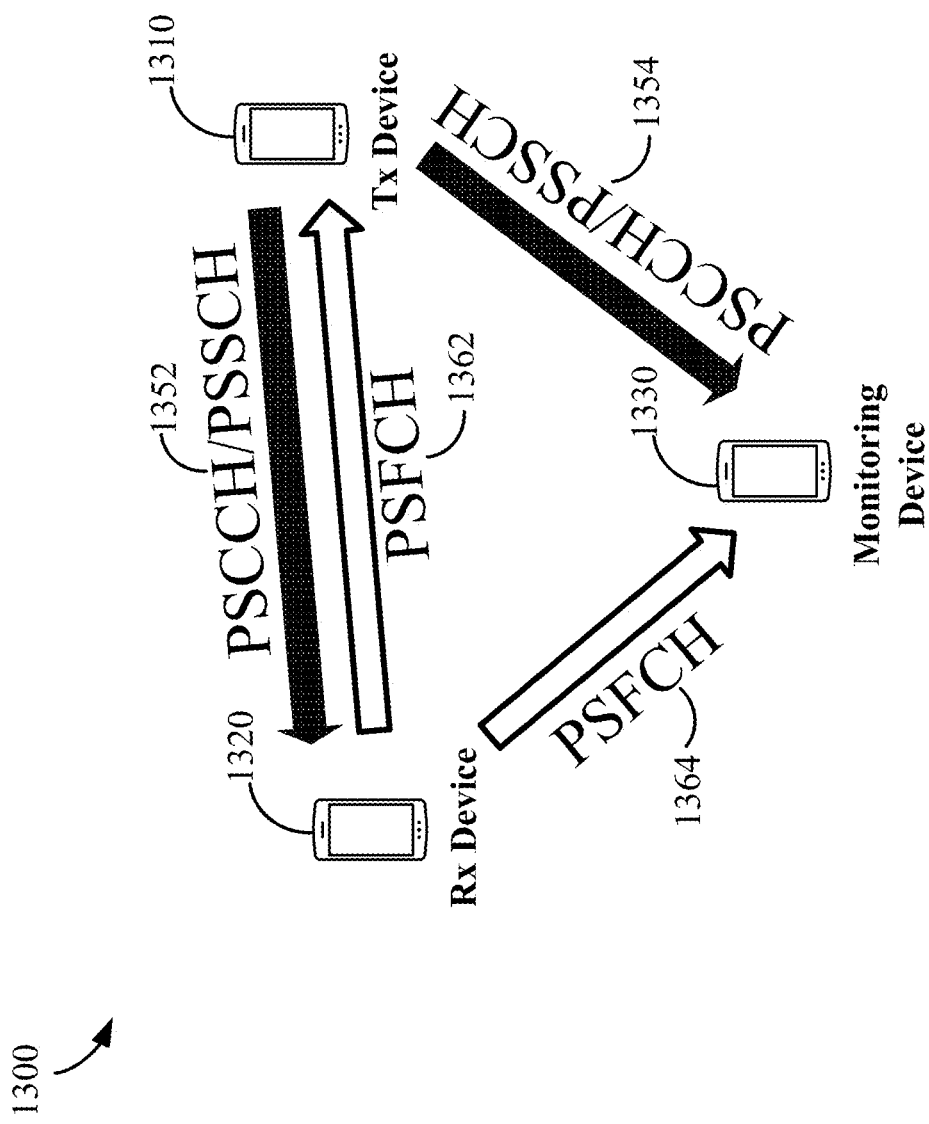
FIG. 13 is an example diagram illustrating communications involving a transmitting wireless device, a receiving wireless device, and a monitoring device, according to some aspects.

FIG. 13 is an example diagram illustrating communications involving a transmitting wireless device 1310, a receiving wireless device 1320, and a monitoring wireless device 1330, according to some aspects. The transmitting wireless device 1310 reserves PSCCH/PSSCH resources for a sidelink communication and additional PSSCH resources for a retransmission of the sidelink communication. At 1352, the transmitting wireless device 1310 transmits a sidelink communication on PSCCH/PSSCH resources, and the receiving wireless device 1320 receives the sidelink communication on the PSCCH/PSSCH resources. At 1354, the monitoring wireless device 1330 may monitor for this sidelink communication on the PSCCH/PSSCH resources and thus may also receive the sidelink communication on the PSCCH/PSSCH resources when the transmitting wireless device 1310 transmits a sidelink communication on PSCCH/PSSCH resources.

At 1362, if the receiving wireless device 1320 successfully receives the sidelink communication transmitted on the PSCCH/PSSCH resources, the receiving wireless device 1320 transmits an ACK message on a PSFCH resource corresponding to the PSCCH/PSSCH resources. In an aspect, when the receiving wireless device 1320 determines that the receiving wireless device 1320 successfully receives the sidelink (e.g., and thus transmits the ACK message), the receiving wireless device 1320 may utilize the additional PSSCH resources reserved for a retransmission of the sidelink communication. As discussed above, this may be because the receiving wireless device 1320 may assume that the additional PSSCH resources will not be used by the transmitting wireless device 1310 for a retransmission of the sidelink communication if the sidelink communication is successfully received.

At 1364, the monitoring wireless device 1330 may monitor for HARQ feedback on the PSFCH resources in response to receiving the sidelink communication from the transmitting wireless device 1310, and thus may receive the ACK message from the receiving wireless device 1320 in response to the sidelink communication. When the monitoring wireless device 1330 receives the ACK message from the receiving wireless device 1320, the monitoring wireless device 1330 may determine that the additional PSSCH resources that were reserved for the retransmission of the sidelink communication is available and thus may utilize the additional PSSCH resources.

Figure 14:
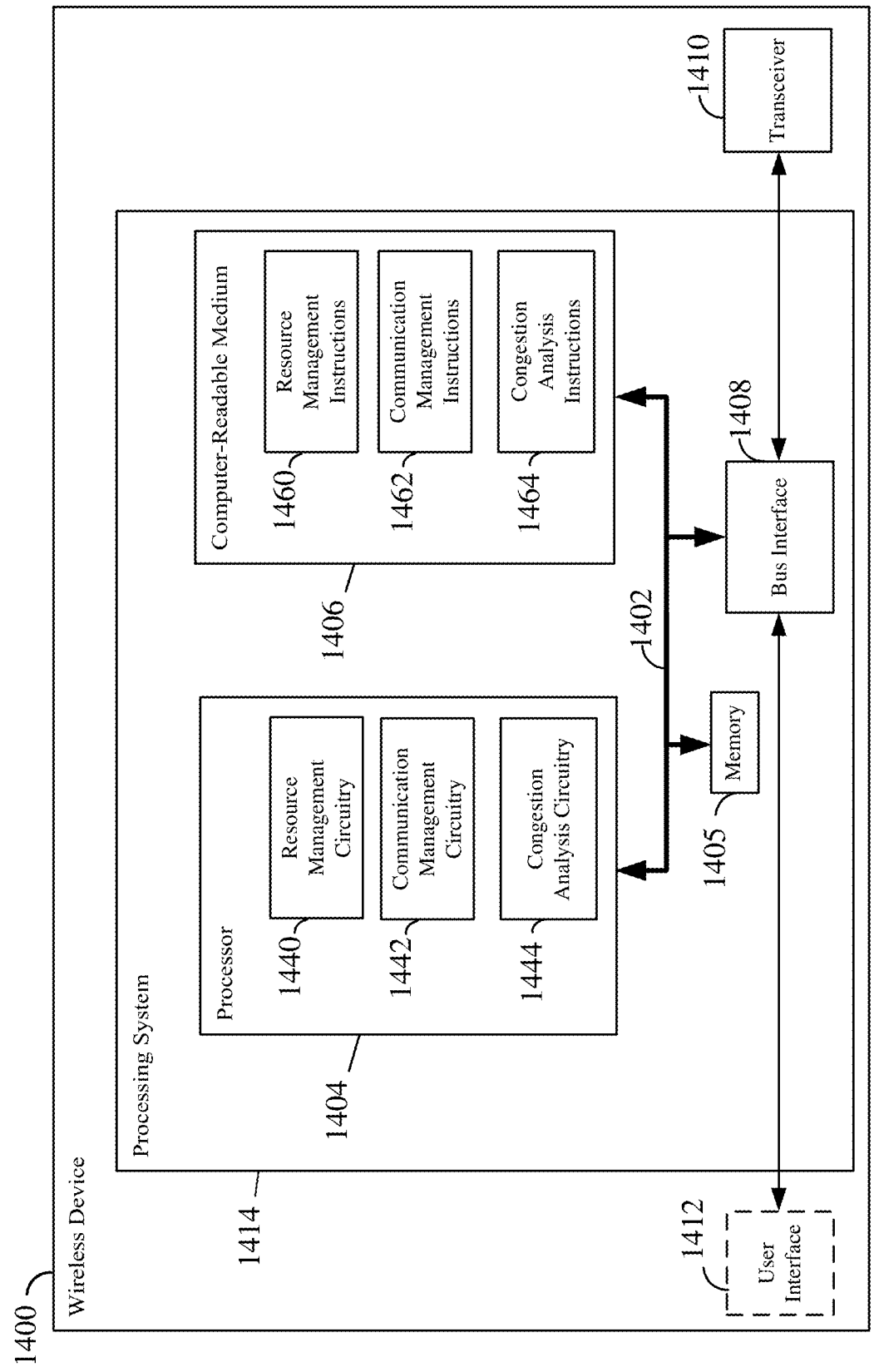
FIG. 14 is a block diagram conceptually illustrating an example of a hardware implementation for a wireless device, according to some aspects.

FIG. 14 is a block diagram illustrating an example of a hardware implementation for a wireless device 1400 employing a processing system 1414. For example, the wireless device 1400 may be a user equipment (UE) as illustrated in any one or more of FIGS. 1, 3, 9, 10, 11, and/or 13.

The wireless device 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless device 1400 may be configured to perform any one or more of the functions described herein. That is, the processor 1404, as utilized in a wireless device 1400, may be used to implement any one or more of the processes and procedures described below and illustrated in FIGS. 15-18.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable storage medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick) may also be provided. Of course, such a user interface 1412 is optional, and may be omitted in some examples, such as a base station.

The processor 1404 is responsible for managing the bus 1402 and general processing, including the execution of software stored on the computer-readable storage medium 1406. The software, when executed by the processor 1404, causes the processing system 1414 to perform the various functions described below for any particular apparatus. The computer-readable storage medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1406. The computer-readable storage medium 1406 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1406 may reside in the processing system 1414, external to the processing system 1414, or distributed across multiple entities including the processing system 1414. The computer-readable storage medium 1406 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the processor 1404 may include resource management circuitry 1440 configured for various functions, including, for example, reserving a first resource for a sidelink communication and one or more second resources for one or more retransmissions, respectively, of the sidelink communication. For example, the resource management circuitry 1440 may be configured to implement one or more of the functions described below in relation to FIGS. 15-16, including, e.g., blocks 1502 and 1602.

In some aspects, the resource management circuitry 1440 may be configured for various functions, including, for example, releasing the one or more second resources to transmit the release indication when the channel congestion level is greater than a first congestion threshold. For example, the resource management circuitry 1440 may be configured to implement one or more of the functions described below in relation to FIG. 16, including, e.g., block 1610.

In some aspects, the resource management circuitry 1440 may be configured for various functions, including, for example, refraining from releasing the one or more second resources to refrain from transmitting the release indication when the channel congestion level is less than or equal to a second congestion threshold. For example, the resource management circuitry 1440 may be configured to implement one or more of the functions described below in relation to FIG. 16, including, e.g., block 1612.

In some aspects, the resource management circuitry 1440 may be configured for various functions, including, for example, randomly selecting between the releasing the one or more second resources and the refraining from releasing the one or more second resources when the channel congestion level is greater than the second congestion threshold and less than or equal to the first congestion threshold. For example, the resource management circuitry 1440 may be configured to implement one or more of the functions described below in relation to FIG. 16, including, e.g., block 1614.

In some aspects, the resource management circuitry 1440 may be configured for various functions, including, for example, releasing the one or more second resources in response to receiving an acknowledgement message for the sidelink communication. For example, the resource management circuitry 1440 may be configured to implement one or more of the functions described below in relation to FIG. 16, including, e.g., block 1652.

In some aspects, the resource management circuitry 1440 may be configured for various functions, including, for example, releasing the one or more second resources in response to receiving a priority indication indicating that another wireless device has reserved the one or more second resources for a communication with a higher priority than the sidelink communication. For example, the resource management circuitry 1440 may be configured to implement one or more of the functions described below in relation to FIG. 16, including, e.g., block 1654.

In some aspects, the resource management circuitry 1440 may be configured for various functions, including, for example, identifying a release indication resource of a plurality of release indication resources that corresponds to the PSSCH resource. For example, the resource management circuitry 1440 may be configured to implement one or more of the functions described below in relation to FIG. 16, including, e.g., block 1656.

In some aspects, the resource management circuitry 1440 may be configured for various functions, including, for example, identifying a PSCCH resource that is associated with the sidelink communication. For example, the resource management circuitry 1440 may be configured to implement one or more of the functions described below in relation to FIG. 16, including, e.g., block 1658.

In some aspects, the resource management circuitry 1440 may be configured for various functions, including, for example, identifying a release indication resource of a plurality of release indication resources that corresponds to the PSSCH resource. For example, the resource management circuitry 1440 may be configured to implement one or more of the functions described below in relation to FIG. 16, including, e.g., block 1660.

In some aspects, the resource management circuitry 1440 may be configured for various functions, including, for example, receiving a first sidelink communication from a transmitting wireless device on a first resource. For example, the resource management circuitry 1440 may be configured to implement one or more of the functions described below in relation to FIGS. 17-18, including, e.g., blocks 1702 and 1806.

In some aspects, the resource management circuitry 1440 may be configured for various functions, including, for example, determining that the one or more second resources are available for the second sidelink communication based on at least one of: determining that the first sidelink communication has been successfully received, or receiving, from the transmitting wireless device, a release indication indicating that the second resource are available. For example, the resource management circuitry 1440 may be configured to implement one or more of the functions described below in relation to FIG. 18, including, e.g., block 1858.

In some aspects, the resource management circuitry 1440 may be configured for various functions, including, for example, determining that the one or more second resources are available based on the release indication. For example, the resource management circuitry 1440 may be configured to implement one or more of the functions described below in relation to FIG. 18, including, e.g., block 1860.

In some aspects of the disclosure, the processor 1404 may include communication management circuitry 1442 configured for various functions, including, for example, transmitting the sidelink communication using the first resource. For example, the communication management circuitry 1442 may be configured to implement one or more of the functions described below in relation to FIGS. 15-16, including, e.g., blocks 1504 and 1606.

In some aspects, the communication management circuitry 1442 may be configured for various functions, including, for example, transmitting, to a second wireless device, a release indication indicating that the one or more second resources are available in response to determining to release the one or more second resources. For example, the communication management circuitry 1442 may be configured to implement one or more of the functions described below in relation to FIGS. 15-16, including, e.g., blocks 1506 and 1662.

In some aspects, the communication management circuitry 1442 may be configured for various functions, including, for example, transmitting a sidelink grant in sidelink control information, the sidelink grant indicating that the one or more second resources are reserved by the first wireless device. For example, the communication management circuitry 1442 may be configured to implement one or more of the functions described below in relation to FIG. 16, including, e.g., block 1604.

In some aspects, the communication management circuitry 1442 may be configured for various functions, including, for example, identifying one or more second resources reserved respectively for one or more retransmissions of the first sidelink communication. For example, the communication management circuitry 1442 may be configured to implement one or more of the functions described below in relation to FIGS. 17-18, including, e.g., blocks 1704 and 1808.

In some aspects, the communication management circuitry 1442 may be configured for various functions, including, for example, reporting the one or more second resources to a higher layer within the wireless device for resource selection in response to a determination that the one or more second resources are available for a second sidelink communication. For example, the communication management circuitry 1442 may be configured to implement one or more of the functions described below in relation to FIGS. 17-18, including, e.g., blocks 1706 and 1862.

In some aspects, the communication management circuitry 1442 may be configured for various functions, including, for example, monitoring for a sidelink grant indicating the one or more second resources reserved. For example, the communication management circuitry 1442 may be configured to implement one or more of the functions described below in relation to FIG. 18, including, e.g., block 1802.

In some aspects, the communication management circuitry 1442 may be configured for various functions, including, for example, receiving a sidelink grant in sidelink control information, the sidelink grant indicating that the one or more second resources are reserved by the transmitting wireless device. For example, the communication management circuitry 1442 may be configured to implement one or more of the functions described below in relation to FIG. 18, including, e.g., block 1804.

In some aspects, the communication management circuitry 1442 may be configured for various functions, including, for example, transmitting, to the transmitting wireless device, an acknowledgement message based on the determining that the first sidelink communication has been successfully received. For example, the communication management circuitry 1442 may be configured to implement one or more of the functions described below in relation to FIG. 18, including, e.g., block 1810.

In some aspects, the communication management circuitry 1442 may be configured for various functions, including, for example, transmitting, to the transmitting wireless device, a priority indication indicating that the wireless device has reserved the one or more second resources for the second sidelink communication with a higher priority than the first sidelink communication. For example, the communication management circuitry 1442 may be configured to implement one or more of the functions described below in relation to FIG. 18, including, e.g., block 1812.

In some aspects, the communication management circuitry 1442 may be configured for various functions, including, for example, monitoring for the release indication when the channel congestion level is greater than a congestion threshold. For example, the communication management circuitry 1442 may be configured to implement one or more of the functions described below in relation to FIG. 18, including, e.g., block 1854.

In some aspects, the communication management circuitry 1442 may be configured for various functions, including, for example, refraining from monitoring for the release indication when the channel congestion level is less than or equal to the congestion threshold. For example, the communication management circuitry 1442 may be configured to implement one or more of the functions described below in relation to FIG. 18, including, e.g., block 1856.

In some aspects, the communication management circuitry 1442 may be configured for various functions, including, for example, transmitting the second sidelink communication on at least one of the one or more second resources. For example, the communication management circuitry 1442 may be configured to implement one or more of the functions described below in relation to FIG. 18, including, e.g., block 1864.

In some aspects of the disclosure, the processor 1404 may include congestion analysis circuitry 1444 configured for various functions, including, for example, determining a channel congestion level associated with a plurality of resources for the wireless communication. For example, the congestion analysis circuitry 1444 may be configured to implement one or more of the functions described below in relation to FIG. 16, including, e.g., block 1608.

In some aspects, the congestion analysis circuitry 1444 may be configured for various functions, including, for example, determining a channel congestion level associated with a plurality of resources for the wireless communication. For example, the congestion analysis circuitry 1444 may be configured to implement one or more of the functions described below in relation to FIG. 18, including, e.g., block 1852.

In some aspects of the disclosure, the computer-readable storage medium 1406 may include resource management software/instructions 1460 configured for various functions, including, for example, reserving a first resource for a sidelink communication and one or more second resources for one or more retransmissions, respectively, of the sidelink communication. For example, the resource management software/instructions 1460 may be configured to implement one or more of the functions described below in relation to FIGS. 15-16, including, e.g., blocks 1502 and 1602.

In some aspects, the resource management software/instructions 1460 may be configured for various functions, including, for example, releasing the one or more second resources to transmit the release indication when the channel congestion level is greater than a first congestion threshold. For example, the resource management software/instructions 1460 may be configured to implement one or more of the functions described below in relation to FIG. 16, including, e.g., block 1610.

In some aspects, the resource management software/instructions 1460 may be configured for various functions, including, for example, refraining from releasing the one or more second resources to refrain from transmitting the release indication when the channel congestion level is less than or equal to a second congestion threshold. For example, the resource management software/instructions 1460 may be configured to implement one or more of the functions described below in relation to FIG. 16, including, e.g., block 1612.

In some aspects, the resource management software/instructions 1460 may be configured for various functions, including, for example, randomly selecting between the releasing the one or more second resources and the refraining from releasing the one or more second resources when the channel congestion level is greater than the second congestion threshold and less than or equal to the first congestion threshold. For example, the resource management software/instructions 1460 may be configured to implement one or more of the functions described below in relation to FIG. 16, including, e.g., block 1614.

In some aspects, the resource management software/instructions 1460 may be configured for various functions, including, for example, releasing the one or more second resources in response to receiving an acknowledgement message for the sidelink communication. For example, the resource management software/instructions 1460 may be configured to implement one or more of the functions described below in relation to FIG. 16, including, e.g., block 1652.

In some aspects, the resource management software/instructions 1460 may be configured for various functions, including, for example, releasing the one or more second resources in response to receiving a priority indication indicating that another wireless device has reserved the one or more second resources for a communication with a higher priority than the sidelink communication. For example, the resource management software/instructions 1460 may be configured to implement one or more of the functions described below in relation to FIG. 16, including, e.g., block 1654.

In some aspects, the resource management software/instructions 1460 may be configured for various functions, including, for example, identifying a release indication resource of a plurality of release indication resources that corresponds to the PSSCH resource. For example, the resource management software/instructions 1460 may be configured to implement one or more of the functions described below in relation to FIG. 16, including, e.g., block 1656.

In some aspects, the resource management software/instructions 1460 may be configured for various functions, including, for example, identifying a PSCCH resource that is associated with the sidelink communication. For example, the resource management software/instructions 1460 may be configured to implement one or more of the functions described below in relation to FIG. 16, including, e.g., block 1658.

In some aspects, the resource management software/instructions 1460 may be configured for various functions, including, for example, identifying a release indication resource of a plurality of release indication resources that corresponds to the PSSCH resource. For example, the resource management software/instructions 1460 may be configured to implement one or more of the functions described below in relation to FIG. 16, including, e.g., block 1660.

In some aspects, the resource management software/instructions 1460 may be configured for various functions, including, for example, receiving a first sidelink communication from a transmitting wireless device on a first resource. For example, the resource management software/instructions 1460 may be configured to implement one or more of the functions described below in relation to FIGS. 17-18, including, e.g., blocks 1702 and 1806.

In some aspects, the resource management software/instructions 1460 may be configured for various functions, including, for example, determining that the one or more second resources are available for the second sidelink communication based on at least one of: determining that the first sidelink communication has been successfully received, or receiving, from the transmitting wireless device, a release indication indicating that the second resource are available. For example, the resource management software/instructions 1460 may be configured to implement one or more of the functions described below in relation to FIG. 18, including, e.g., block 1858.

In some aspects, the resource management software/instructions 1460 may be configured for various functions, including, for example, determining that the one or more second resources are available based on the release indication. For example, the resource management software/instructions 1460 may be configured to implement one or more of the functions described below in relation to FIG. 18, including, e.g., block 1860.

In some aspects of the disclosure, the computer-readable storage medium 1406 may include communication management software/instructions 1462 configured for various functions, including, for example, transmitting the sidelink communication using the first resource. For example, the communication management software/instructions 1462 may be configured to implement one or more of the functions described below in relation to FIGS. 15-16, including, e.g., blocks 1504 and 1606.

In some aspects, the communication management software/instructions 1462 may be configured for various functions, including, for example, transmitting, to a second wireless device, a release indication indicating that the one or more second resources are available in response to determining to release the one or more second resources. For example, the communication management software/instructions 1462 may be configured to implement one or more of the functions described below in relation to FIGS. 15-16, including, e.g., blocks 1506 and 1662.

In some aspects, the communication management software/instructions 1462 may be configured for various functions, including, for example, transmitting a sidelink grant in sidelink control information, the sidelink grant indicating that the one or more second resources are reserved by the first wireless device. For example, the communication management software/instructions 1462 may be configured to implement one or more of the functions described below in relation to FIG. 16, including, e.g., block 1604.

In some aspects, the communication management software/instructions 1462 may be configured for various functions, including, for example, identifying one or more second resources reserved respectively for one or more retransmissions of the first sidelink communication. For example, the communication management software/instructions 1462 may be configured to implement one or more of the functions described below in relation to FIGS. 17-18, including, e.g., blocks 1704 and 1808.

In some aspects, the communication management software/instructions 1462 may be configured for various functions, including, for example, reporting the one or more second resources to a higher layer within the wireless device for resource selection in response to a determination that the one or more second resources are available for a second sidelink communication. For example, the communication management software/instructions 1462 may be configured to implement one or more of the functions described below in relation to FIGS. 17-18, including, e.g., blocks 1706 and 1862.

In some aspects, the communication management software/instructions 1462 may be configured for various functions, including, for example, monitoring for a sidelink grant indicating the one or more second resources reserved. For example, the communication management software/instructions 1462 may be configured to implement one or more of the functions described below in relation to FIG. 18, including, e.g., block 1802.

In some aspects, the communication management software/instructions 1462 may be configured for various functions, including, for example, receiving a sidelink grant in sidelink control information, the sidelink grant indicating that the one or more second resources are reserved by the transmitting wireless device. For example, the communication management software/instructions 1462 may be configured to implement one or more of the functions described below in relation to FIG. 18, including, e.g., block 1804.

In some aspects, the communication management software/instructions 1462 may be configured for various functions, including, for example, transmitting, to the transmitting wireless device, an acknowledgement message based on the determining that the first sidelink communication has been successfully received. For example, the communication management software/instructions 1462 may be configured to implement one or more of the functions described below in relation to FIG. 18, including, e.g., block 1810.

In some aspects, the communication management software/instructions 1462 may be configured for various functions, including, for example, transmitting, to the transmitting wireless device, a priority indication indicating that the wireless device has reserved the one or more second resources for the second sidelink communication with a higher priority than the first sidelink communication. For example, the communication management software/instructions 1462 may be configured to implement one or more of the functions described below in relation to FIG. 18, including, e.g., block 1812.

In some aspects, the communication management software/instructions 1462 may be configured for various functions, including, for example, monitoring for the release indication when the channel congestion level is greater than a congestion threshold. For example, the communication management software/instructions 1462 may be configured to implement one or more of the functions described below in relation to FIG. 18, including, e.g., block 1854.

In some aspects, the communication management software/instructions 1462 may be configured for various functions, including, for example, refraining from monitoring for the release indication when the channel congestion level is less than or equal to the congestion threshold. For example, the communication management software/instructions 1462 may be configured to implement one or more of the functions described below in relation to FIG. 18, including, e.g., block 1856.

In some aspects, the communication management software/instructions 1462 may be configured for various functions, including, for example, transmitting the second sidelink communication on at least one of the one or more second resources. For example, the communication management software/instructions 1462 may be configured to implement one or more of the functions described below in relation to FIG. 18, including, e.g., block 1864.

In some aspects of the disclosure, the computer-readable storage medium 1406 may include congestion analysis software/instructions 1464 configured for various functions, including, for example, determining a channel congestion level associated with a plurality of resources for the wireless communication. For example, the congestion analysis software/instructions 1464 may be configured to implement one or more of the functions described below in relation to FIG. 16, including, e.g., block 1608.

In some aspects, the congestion analysis software/instructions 1464 may be configured for various functions, including, for example, determining a channel congestion level associated with a plurality of resources for the wireless communication. For example, the congestion analysis software/instructions 1464 may be configured to implement one or more of the functions described below in relation to FIG. 18, including, e.g., block 1852.

Figure 15:
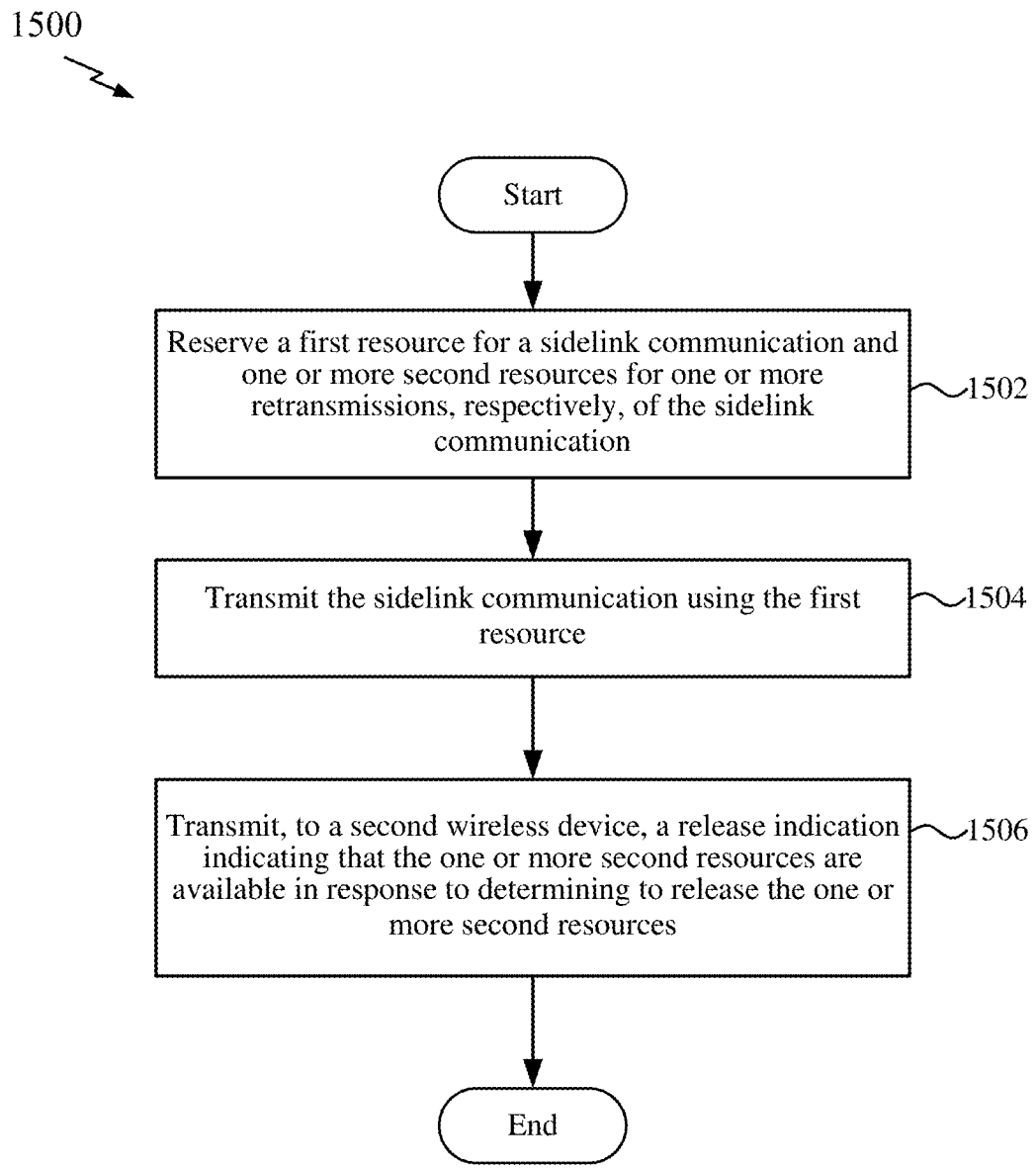
FIG. 15 is a flow chart illustrating an exemplary process for wireless communication, according to some aspects.

FIG. 15 is a flow chart illustrating an exemplary process 1500 for wireless communication by a first wireless device in accordance with some aspects. As described below, some or all illustrated features may be omitted in a particular implementation within the scope of the present disclosure, and some illustrated features may not be required for implementation of all embodiments. In some examples, the process 1500 may be carried out by the wireless device 1400 illustrated in FIG. 14. In some examples, the process 1500 may be carried out by any suitable apparatus or means for carrying out the functions or algorithm described below.

At block 1502, the first wireless device may reserve a first resource for a sidelink communication and one or more second resources for one or more retransmissions, respectively, of the sidelink communication. For example, the resource management circuitry 1440 shown and described above in connection with FIG. 14 may provide a means for reserving the first resource and the one or more second resources.

At block 1504, the first wireless device may transmit the sidelink communication using the first resource. For example, the communication management circuitry 1442 shown and described above in connection with FIG. 14 may provide means for transmitting the sidelink communication.

At block 1506, the first wireless device may transmit, to a second wireless device, a release indication indicating that the one or more second resources are available in response to determining to release the one or more second resources. For example, the communication management circuitry 1442 shown and described above in connection with FIG. 14 may provide means for transmitting the release indication in response to determining to release the one or more second resources.

Figure 16A:
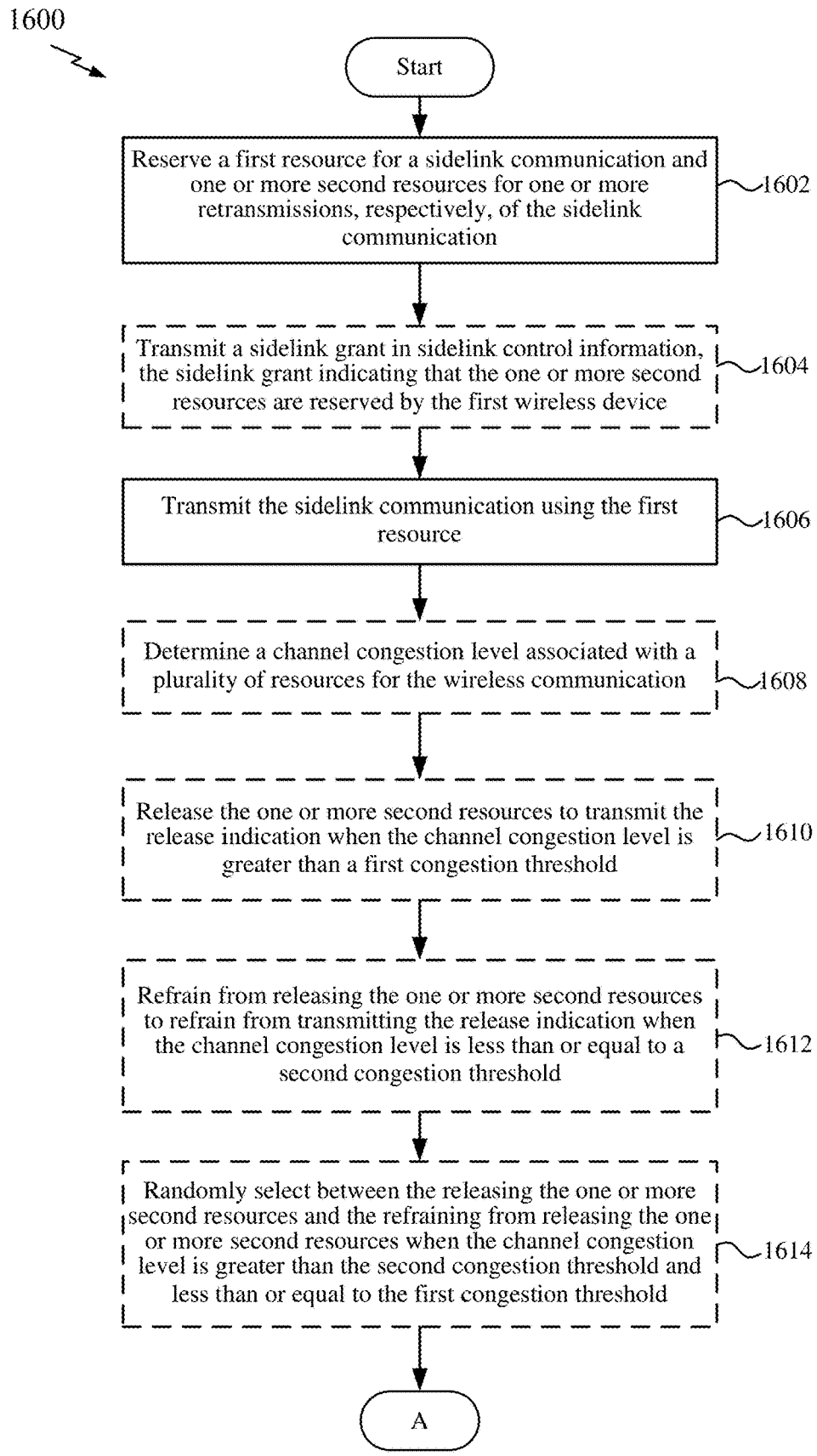
FIGS. 16A and 16B illustrate a flow chart of another exemplary process for wireless communication, according to some aspects.
Figure 16B:
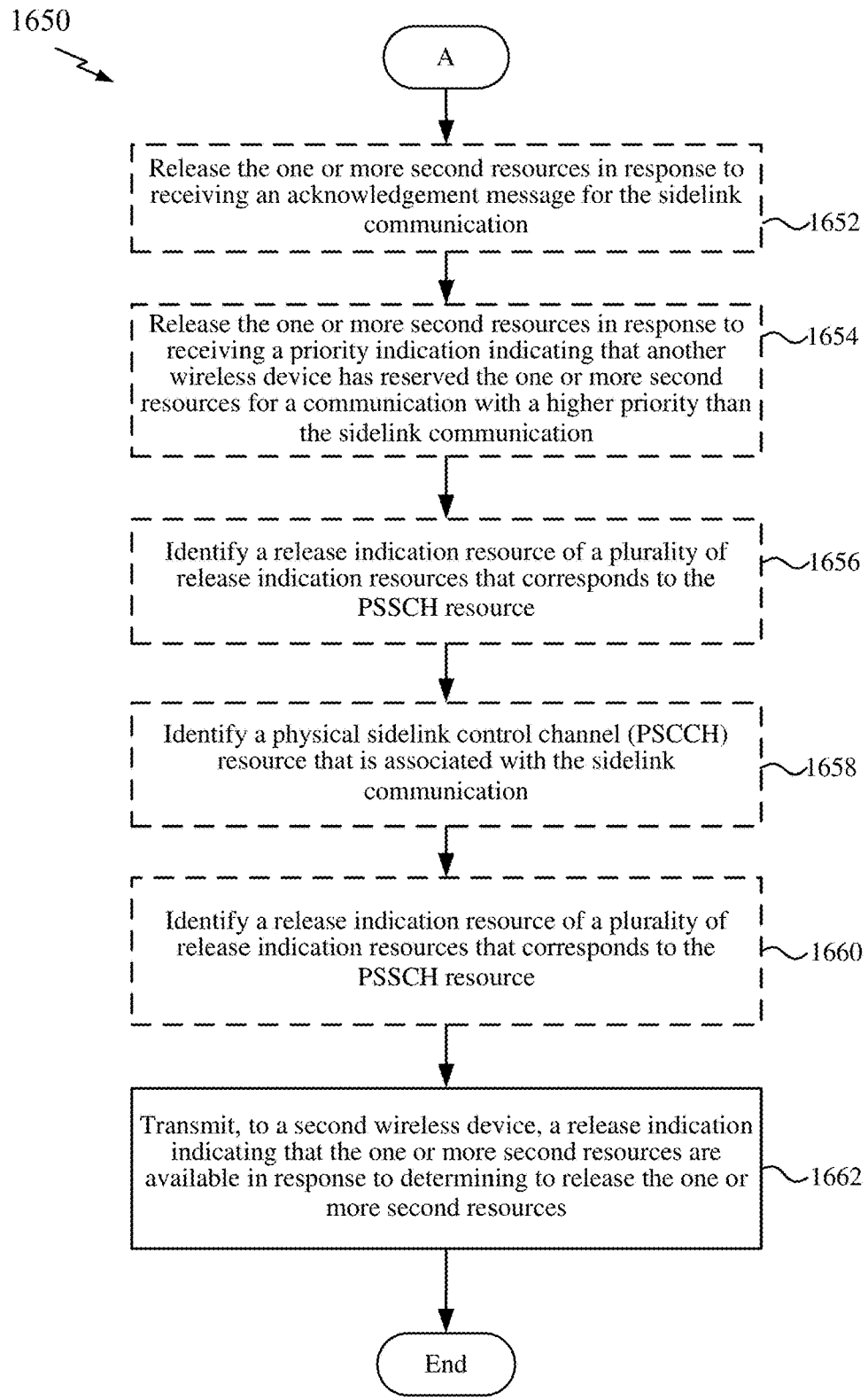

FIGS. 16A and 16B illustrate a flow chart of another exemplary process 1600 for wireless communication by a first wireless device in accordance with some aspects. As described below, some or all illustrated features may be omitted in a particular implementation within the scope of the present disclosure, and some illustrated features may not be required for implementation of all embodiments. In some examples, the process 1600 may be carried out by the wireless device 1400 illustrated in FIG. 14. In some examples, the process 1600 may be carried out by any suitable apparatus or means for carrying out the functions or algorithm described below.

At block 1602, the first wireless device may reserve a first resource for a sidelink communication and one or more second resources for one or more retransmissions, respectively, of the sidelink communication. For example, the resource management circuitry 1440 shown and described above in connection with FIG. 14 may provide a means for reserving the first resource and the one or more second resources.

At block 1604, in an aspect, the first wireless device may transmit a sidelink grant in sidelink control information, the sidelink grant indicating that the one or more second resources are reserved by the first wireless device. For example, the communication management circuitry 1442 shown and described above in connection with FIG. 14 may provide a means for transmitting the sidelink grant.

At block 1606, the first wireless device may transmit the sidelink communication using the first resource. For example, the communication management circuitry 1442 shown and described above in connection with FIG. 14 may provide a means for transmitting the sidelink communication.

At block 1608, in an aspect, the first wireless device may determine a channel congestion level associated with a plurality of resources for the wireless communication. For example, the congestion analysis circuitry 1444 shown and described above in connection with FIG. 14 may provide a means for determining the channel congestion level. In an aspect, the channel congestion level may be a CBR.

At block 1610, in an aspect, the first wireless device may release the one or more second resources to transmit the release indication when the channel congestion level is greater than a first congestion threshold. For example, the resource management circuitry 1440 shown and described above in connection with FIG. 14 may provide a means for releasing the one or more second resources.

At block 1612, in an aspect, the first wireless device may refrain from releasing the one or more second resources to refrain from transmitting the release indication when the channel congestion level is less than or equal to a second congestion threshold. For example, the resource management circuitry 1440 shown and described above in connection with FIG. 14 may provide means for refraining from releasing the one or more second resources.

In an aspect, the first congestion threshold may be the same as the second congestion threshold.

At block 1614, in an aspect, the first wireless device may randomly select between the releasing the one or more second resources and the refraining from releasing the one or more second resources when the channel congestion level is greater than the second congestion threshold and less than or equal to the first congestion threshold. For example, the resource management circuitry 1440 shown and described above in connection with FIG. 14 may provide a means for randomly selecting between the releasing the one or more second resources and the refraining from releasing the one or more second resources. In an aspect, the randomly selecting at block 1614 may be based on the channel congestion level.

At block 1652 of FIG. 16B, in an aspect, the first wireless device may release the one or more second resources in response to receiving an acknowledgement message for the sidelink communication. For example, the resource management circuitry 1440 shown and described above in connection with FIG. 14 may provide a means for releasing the one or more second resources.

At block 1654, in an aspect, the first wireless device may release the one or more second resources in response to receiving a priority indication indicating that another wireless device has reserved the one or more second resources for a communication with a higher priority than the sidelink communication. For example, the resource management circuitry 1440 shown and described above in connection with FIG. 14 may provide a means for releasing the one or more second resources.

In an aspect, the release indication may include at least one of: an indication that the one or more second resources are released, a source identifier associated with the first wireless device releasing the one or more second resources, one or more triggers for releasing the one or more second resources, the one or more triggers indicating at least one of the acknowledgement message or the priority indication, and an indication indicating that the one or more second resources being released is for a periodic reservation, or for an aperiodic reservation, or for both the periodic reservation and the aperiodic reservation.

In an aspect, the first resource may be a PSSCH resource on which the sidelink communication is transmitted. At block 1656, in an aspect, the first wireless device may identify a release indication resource of a plurality of release indication resources that corresponds to the PSSCH resource. For example, the resource management circuitry 1440 shown and described above in connection with FIG. 14 may provide means for identifying the release indication resource. In an aspect, the release indication resource may be associated with at least one of a source identifier of the first wireless device or one or more destination identifiers of the second wireless device.

At block 1658, in an aspect, the first wireless device may identify a PSCCH resource that is associated with the sidelink communication. For example, the resource management circuitry 1440 shown and described above in connection with FIG. 14 may provide means for identifying the PSCCH resource.

At block 1660, in an aspect, the first wireless device may identify a release indication resource of a plurality of release indication resources that corresponds to the PSCCH resource. For example, the resource management circuitry 1440 shown and described above in connection with FIG. 14 may provide means for identifying the release indication resource.

At block 1662, the first wireless device may transmit, to a second wireless device, a release indication indicating that the one or more second resources are available in response to determining to release the one or more second resources. For example, the communication management circuitry 1442 shown and described above in connection with FIG. 14 may provide a means for transmitting the release indication in response to determining to release the one or more second resources.

In an aspect, the release indication may be transmitted on the release indication resource.

In an aspect, the release indication may indicate that the one or more second resources indicated by the sidelink grant are available.

In one configuration, the wireless device 1400 for wireless communication includes means for reserving a first resource for a sidelink communication and one or more second resources for one or more retransmissions, respectively, of the sidelink communication, means for transmitting the sidelink communication using the first resource, and means for transmitting, to a second wireless device, a release indication indicating that the one or more second resources are available in response to determining to release the one or more second resources. In an aspect, the wireless device 1400 may include means for releasing the one or more second resources in response to receiving an acknowledgement message for the sidelink communication, and means for releasing the one or more second resources in response to receiving a priority indication indicating that another wireless device has reserved the one or more second resources for a communication with a higher priority than the sidelink communication.

In an aspect, the wireless device 1400 may include means for determining a channel congestion level associated with a plurality of resources for the wireless communication, means for releasing the one or more second resources to transmit the release indication when the channel congestion level is greater than a first congestion threshold, means for refraining from releasing the one or more second resources to refrain from transmitting the release indication when the channel congestion level is less than or equal to a second congestion threshold, and means for randomly selecting between the releasing the one or more second resources and the refraining from releasing the one or more second resources when the channel congestion level is greater than the second congestion threshold and less than or equal to the first congestion threshold. In an aspect, the wireless device 1400 may include means for identifying a release indication resource of a plurality of release indication resources that corresponds to the PSSCH resource. In an aspect, the wireless device 1400 may include means for identifying a PSCCH resource that is associated with the sidelink communication, and means for identifying a release indication resource of a plurality of release indication resources that corresponds to the PSCCH resource. In an aspect, the wireless device 1400 may include means for transmitting a sidelink grant in sidelink control information, the sidelink grant indicating that the one or more second resources are reserved by the first wireless device.

In one aspect, the aforementioned means may be the processor(s) 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 3, 9, 10, 11, 13 and/or 14, and utilizing, for example, the processes and/or algorithms described herein in relation to FIGS. 15 and/or 16.

Figure 17:
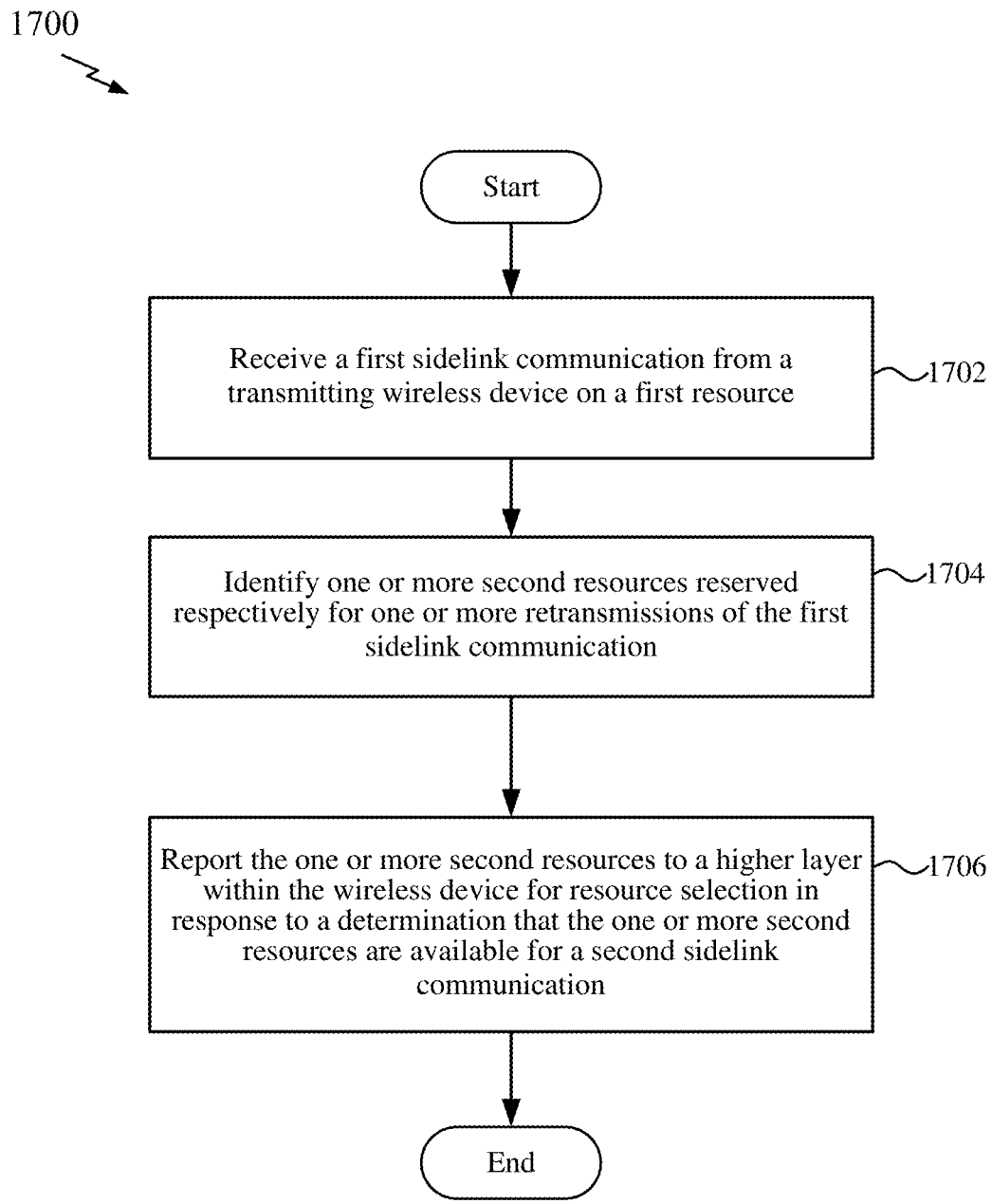
FIG. 17 is a flow chart illustrating another exemplary process for wireless communication, according to some aspects.

FIG. 17 is a flow chart illustrating another exemplary process 1700 for wireless communication by a wireless device in accordance with some aspects. As described below, some or all illustrated features may be omitted in a particular implementation within the scope of the present disclosure, and some illustrated features may not be required for implementation of all embodiments. In some examples, the process 1700 may be carried out by the wireless device 1400 illustrated in FIG. 14. In some examples, the process 1700 may be carried out by any suitable apparatus or means for carrying out the functions or algorithm described below.

At block 1702, the wireless device may receive a first sidelink communication from a transmitting wireless device on a first resource. For example, the resource management circuitry 1440 shown and described above in connection with FIG. 14 may provide a means for receiving the first sidelink communication.

At block 1704, the wireless device may identify one or more second resources reserved respectively for one or more retransmissions of the first sidelink communication. For example, the communication management circuitry 1442 shown and described above in connection with FIG. 14 may provide a means for identifying the one or more second resources.

At block 1706, the wireless device may report the one or more second resources to a higher layer within the wireless device for resource selection in response to a determination that the one or more second resources are available for a second sidelink communication. For example, the communication management circuitry 1442 shown and described above in connection with FIG. 14 may provide a means for reporting the one or more second resources to a higher layer.

Figure 18A:
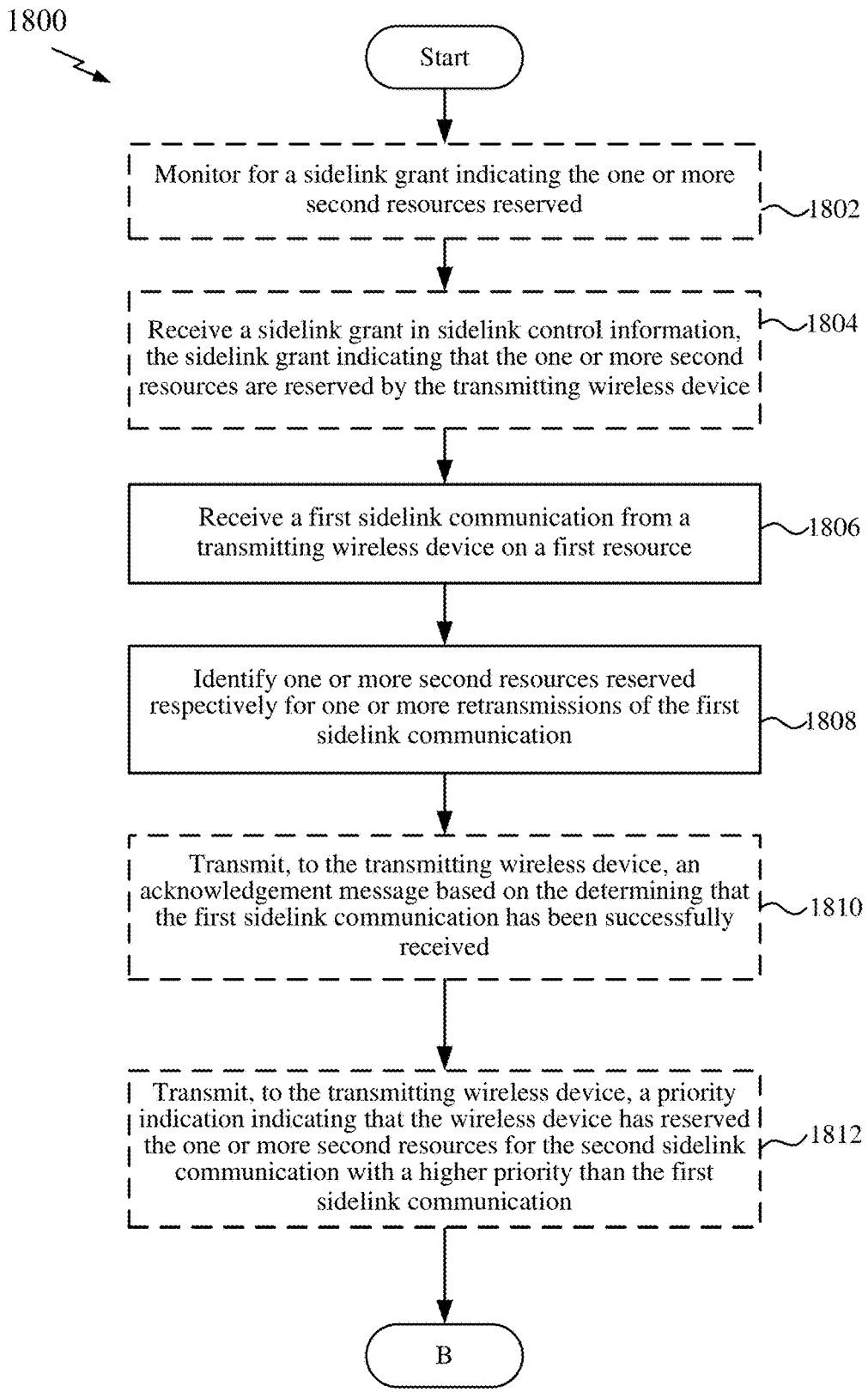
FIGS. 18A and 18B illustrate a flow chart of another exemplary process for wireless communication, according to some aspects.
Figure 18B:
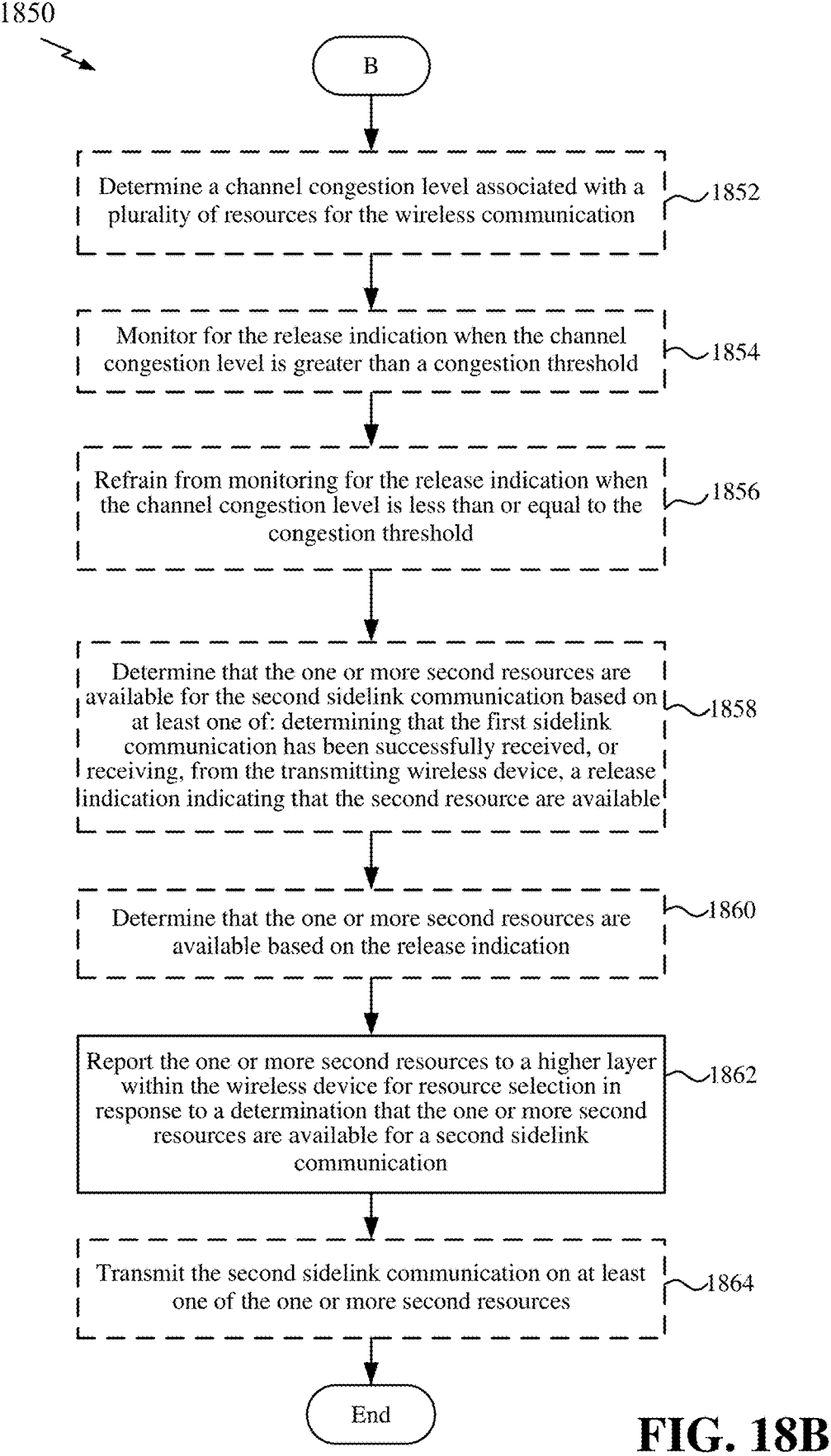

FIGS. 18A and 18B illustrate a flow chart of another exemplary process 1800 for wireless communication by a wireless device in accordance with some aspects. As described below, some or all illustrated features may be omitted in a particular implementation within the scope of the present disclosure, and some illustrated features may not be required for implementation of all embodiments. In some examples, the process 1800 may be carried out by the wireless device 1400 illustrated in FIG. 14. In some examples, the process 1800 may be carried out by any suitable apparatus or means for carrying out the functions or algorithm described below.

At block 1802, in an aspect, the wireless device may monitor for a sidelink grant indicating the one or more second resources reserved. For example, the communication management circuitry 1442 shown and described above in connection with FIG. 14 may provide a means for monitoring for the sidelink grant.

At block 1804, in an aspect, the wireless device may receive a sidelink grant in sidelink control information, the sidelink grant indicating that the one or more second resources are reserved by the transmitting wireless device. For example, the communication management circuitry 1442 shown and described above in connection with FIG. 14 may provide a means for receiving the sidelink grant.

At block 1806, in an aspect, the wireless device may receive a first sidelink communication from a transmitting wireless device on a first resource. For example, the resource management circuitry 1440 shown and described above in connection with FIG. 14 may provide a means for receiving the first sidelink communication.

At block 1808, the wireless device may identify one or more second resources reserved respectively for one or more retransmissions of the first sidelink communication. For example, the communication management circuitry 1442 shown and described above in connection with FIG. 14 may provide a means for identifying the one or more second resources.

At block 1810, in an aspect, the wireless device may transmit, to the transmitting wireless device, an acknowledgement message based on the determining that the first sidelink communication has been successfully received. For example, the communication management circuitry 1442 shown and described above in connection with FIG. 14 may provide a means for transmitting the acknowledgement message.

At block 1812, in an aspect, the wireless device may transmit, to the transmitting wireless device, a priority indication indicating that the wireless device has reserved the one or more second resources for the second sidelink communication with a higher priority than the first sidelink communication. For example, the communication management circuitry 1442 shown and described above in connection with FIG. 14 may provide a means for transmitting the priority indication.

At block 1852, as shown in FIG. 18B, in an aspect, the wireless device may determine a channel congestion level associated with a plurality of resources for the wireless communication. For example, the congestion analysis circuitry 1444 shown and described above in connection with FIG. 14 may provide a means for determine the channel congestion level.

At block 1854, in an aspect, the wireless device may monitor for the release indication when the channel congestion level is greater than a congestion threshold. For example, the communication management circuitry 1442 shown and described above in connection with FIG. 14 may provide a means for monitoring for the release indication.

At block 1856, in an aspect, the wireless device may refrain from monitoring for the release indication when the channel congestion level is less than or equal to the congestion threshold. For example, the communication management circuitry 1442 shown and described above in connection with FIG. 14 may provide a means for refraining from monitoring for the release indication.

At block 1858, in an aspect, the wireless device may determine that the one or more second resources are available for the second sidelink communication based on at least one of: determining that the first sidelink communication has been successfully received, or receiving, from the transmitting wireless device, the release indication indicating that the second resource are available. For example, the resource management circuitry 1440 shown and described above in connection with FIG. 14 may provide a means for determining that the one or more second resources are available.

In an aspect, the release indication may be received in response to at least one of the transmitting the acknowledgement message at block 1810 or the transmitting the priority indication at block 1812.

In an aspect, the release indication may include at least one of: an indication that the one or more second resources are released, a source identifier associated with the wireless device releasing the one or more second resources, one or more triggers for releasing the one or more second resources, the one or more triggers indicating at least one of the acknowledgement message or the priority indication, and an indication indicating that the one or more second resources being released is for a periodic reservation, or for an aperiodic reservation, or for both the periodic reservation and the aperiodic reservation.

In an aspect, the first resource may be a PSSCH resource on which the first sidelink communication is received, and the release indication may be transmitted on a release indication resource of a plurality of release indication resources that corresponds to the PSSCH resource. In an aspect, the release indication resource may be associated with at least one of a source identifier of the transmitting wireless device or a destination identifier of the wireless device. In an aspect, the release indication may be transmitted on a release indication resource of a plurality of release indication resources that corresponds to a PSCCH resource associated with the first sidelink communication.

In an aspect, the release indication may indicate that the one or more second resources indicated by the sidelink grant are available.

In an aspect, the receiving the first sidelink communication at block 1806 may include monitoring for the first sidelink communication transmitted from a transmitting wireless device to a receiving wireless device, and the determining that the first sidelink communication has been successfully received at block 1858 may include detecting an acknowledgement message transmitted from the receiving wireless device to the transmitting wireless device in response to the first sidelink communication, where the second sidelink communication may be performed on the at least one of the one or more second resources in response to the detecting the acknowledgement message.

In an aspect, the first resource may be a PSSCH resource on which the first sidelink communication is received, and the acknowledgement message may be transmitted on a PSFCH resource.

At block 1860, in an aspect, the wireless device may determine that the one or more second resources are available based on the release indication. For example, the resource management circuitry 1440 shown and described above in connection with FIG. 14 may provide a means for determining that the one or more second resources are available.

At block 1862, the wireless device may report the one or more second resources to a higher layer within the wireless device for resource selection in response to a determination that the one or more second resources are available for a second sidelink communication. For example, the communication management circuitry 1442 shown and described above in connection with FIG. 14 may provide a means for reporting the one or more second resources to a higher layer.

At block 1864, in an aspect, the wireless device may transmit the second sidelink communication on at least one of the one or more second resources. For example, the communication management circuitry 1442 shown and described above in connection with FIG. 14 may provide a means for transmitting the second sidelink communication.

In one configuration, the wireless device 1400 for wireless communication includes means for receiving a first sidelink communication from a transmitting wireless device on a first resource, means for identifying one or more second resources reserved respectively for one or more retransmissions of the first sidelink communication, and means for reporting the one or more second resources to a higher layer within the wireless device for resource selection in response to a determination that the one or more second resources are available for a second sidelink communication. In an aspect, the wireless device 1400 may include means for determining that the one or more second resources are available for the second sidelink communication based on at least one of: determining that the first sidelink communication has been successfully received, or receiving, from the transmitting wireless device, a release indication indicating that the second resource are available. In an aspect, the wireless device 1400 may include means for transmitting, to the transmitting wireless device, an acknowledgement message based on the determining that the first sidelink communication has been successfully received, and means for transmitting, to the transmitting wireless device, a priority indication indicating that the wireless device has reserved the one or more second resources for the second sidelink communication with a higher priority than the first sidelink communication.

In an aspect, the wireless device 1400 may include means for determining a channel congestion level associated with a plurality of resources for the wireless communication, means for monitoring for the release indication when the channel congestion level is greater than a congestion threshold, and means for refraining from monitoring for the release indication when the channel congestion level is less than or equal to the congestion threshold. In an aspect, the wireless device 1400 may include means for receiving a sidelink grant in sidelink control information, the sidelink grant indicating that the one or more second resources are reserved by the transmitting wireless device. In an aspect, the wireless device 1400 may include means for monitoring for a sidelink grant indicating the one or more second resources reserved, means for monitoring for the release indication associated with the one or more second resources indicated by the sidelink grant, and means for determining that the one or more second resources are available based on the release indication. In an aspect, the wireless device 1400 may include means for transmitting the second sidelink communication on at least one of the one or more second resources.

In one aspect, the aforementioned means may be the processor(s) 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 3, 9, 10, 11, 13 and/or 14, and utilizing, for example, the processes and/or algorithms described herein in relation to FIGS. 17-18.

The following provides an overview of several aspects of the present disclosure.

Aspect 1. A method of wireless communication by a first wireless device, comprising: reserving a first resource for a sidelink communication and one or more second resources for one or more retransmissions, respectively, of the sidelink communication; transmitting the sidelink communication using the first resource; and transmitting, to a second wireless device, a release indication indicating that the one or more second resources are available in response to determining to release the one or more second resources.

Aspect 2. The method of aspect 1, further comprising at least one of: releasing the one or more second resources in response to receiving an acknowledgement message for the sidelink communication; or releasing the one or more second resources in response to receiving a priority indication indicating that another wireless device has reserved the one or more second resources for a communication with a higher priority than the sidelink communication.

Aspect 3. The method of aspect 2, wherein the release indication includes at least one of: an indication that the one or more second resources are released; a source identifier associated with the first wireless device releasing the one or more second resources; one or more triggers for releasing the one or more second resources, the one or more triggers indicating at least one of the acknowledgement message or the priority indication; and an indication indicating that the one or more second resources being released is for a periodic reservation, or for an aperiodic reservation, or for both the periodic reservation and the aperiodic reservation.

Aspect 4. The method of any of aspects 1 through 3, further comprising: determining a channel congestion level associated with a plurality of resources for the wireless communication; releasing the one or more second resources to transmit the release indication when the channel congestion level is greater than a first congestion threshold; and refraining from releasing the one or more second resources to refrain from transmitting the release indication when the channel congestion level is less than or equal to a second congestion threshold.

Aspect 5. The method of aspect 4, wherein the first congestion threshold is the same as the second congestion threshold.

Aspect 6. The method of aspect 4, further comprising: randomly selecting between the releasing the one or more second resources and the refraining from releasing the one or more second resources when the channel congestion level is greater than the second congestion threshold and less than or equal to the first congestion threshold.

Aspect 7. The method of aspect 6, wherein the randomly selecting is based on the channel congestion level.

Aspect 8. The method of any of aspects 4 through 7, wherein the channel congestion level is a channel busy ratio (CBR).

Aspect 9. The method of any of aspects 1 through 8, wherein the first resource is a physical sidelink shared channel (PSSCH) resource on which the sidelink communication is transmitted, and wherein the method further comprises: identifying a release indication resource of a plurality of release indication resources that corresponds to the PSSCH resource, wherein the release indication is transmitted on the release indication resource.

Aspect 10. The method of aspect 9, wherein the release indication resource is associated with at least one of a source identifier of the first wireless device or one or more destination identifiers of the second wireless device.

Aspect 11. The method of any of aspects 1 through 10, further comprising: identifying a physical sidelink control channel (PSCCH) resource that is associated with the sidelink communication; identifying a release indication resource of a plurality of release indication resources that corresponds to the PSCCH resource, wherein the release indication is transmitted on the release indication resource.

Aspect 12. The method of any of aspects 1 through 11, further comprising: transmitting a sidelink grant in sidelink control information, the sidelink grant indicating that the one or more second resources are reserved by the first wireless device, wherein the release indication indicates that the one or more second resources indicated by the sidelink grant are available.

Aspect 13: A first wireless device comprising: a transceiver configured to communicate with a radio access network, a memory, and a processor communicatively coupled to the transceiver and the memory, wherein the processor and the memory are configured to perform any one of aspects 1 through 12.

Aspect 14: A first wireless device configured for wireless communication comprising at least one means for performing any one of aspects 1 through 12.

Aspect 15: An article of manufacture for use by a first wireless device in a wireless communication network, the article comprising: a non-transitory computer-readable medium having stored therein instructions executable by one or more processors of the first wireless device to perform any one of aspects 1 through 12.

Aspect 16. A method of wireless communication by a wireless device, comprising: receiving a first sidelink communication from a transmitting wireless device on a first resource; identifying one or more second resources reserved respectively for one or more retransmissions of the first sidelink communication; and reporting the one or more second resources to a higher layer within the wireless device for resource selection in response to a determination that the one or more second resources are available for a second sidelink communication.

Aspect 17. The method of aspect 16, further comprising: determining that the one or more second resources are available for the second sidelink communication based on at least one of: determining that the first sidelink communication has been successfully received, or receiving, from the transmitting wireless device, a release indication indicating that the second resource are available.

Aspect 18. The method of aspect 17, further comprising at least one of: transmitting, to the transmitting wireless device, an acknowledgement message based on the determining that the first sidelink communication has been successfully received; or transmitting, to the transmitting wireless device, a priority indication indicating that the wireless device has reserved the one or more second resources for the second sidelink communication with a higher priority than the first sidelink communication, wherein the release indication is received in response to at least one of the transmitting the acknowledgement message or the transmitting the priority indication.

Aspect 19. The method of aspect 18, wherein the release indication includes at least one of: an indication that the one or more second resources are released; a source identifier associated with the wireless device releasing the one or more second resources; one or more triggers respectively for releasing the one or more second resources, each of the one or more triggers indicating at least one of the acknowledgement message or the priority indication; and an indication indicating that the one or more second resources being released is for a periodic reservation, or for an aperiodic reservation, or for both the periodic reservation and the aperiodic reservation.

Aspect 20. The method of any of aspects 17 through 19, further comprising: determining a channel congestion level associated with a plurality of resources for the wireless communication; monitoring for the release indication when the channel congestion level is greater than a congestion threshold; and refraining from monitoring for the release indication when the channel congestion level is less than or equal to the congestion threshold.

Aspect 21. The method of any of aspects 17 through 20, wherein the first resource is a physical sidelink shared channel (PSSCH) resource on which the first sidelink communication is received, and wherein the release indication is transmitted on a release indication resource of a plurality of release indication resources that corresponds to the PSSCH resource.

Aspect 22. The method of aspect 21, wherein the release indication resource is associated with at least one of a source identifier of the transmitting wireless device or a destination identifier of the wireless device.

Aspect 23. The method of any of aspects 17 through 22, wherein the release indication is transmitted on a release indication resource of a plurality of release indication resources that corresponds to a PSCCH resource associated with the first sidelink communication.

Aspect 24. The method of any of aspects 17 through 23, further comprising: receiving a sidelink grant in sidelink control information, the sidelink grant indicating that the one or more second resources are reserved by the transmitting wireless device, wherein the release indication indicates that the one or more second resources indicated by the sidelink grant are available.

Aspect 25. The method of any of aspects 17 through 24, further comprising: monitoring for a sidelink grant indicating the one or more second resources reserved; monitoring for the release indication associated with the one or more second resources indicated by the sidelink grant; and determining that the one or more second resources are available based on the release indication.

Aspect 26. The method of any of aspects 17 through 25, wherein the receiving the first sidelink communication comprises monitoring for the first sidelink communication transmitted from a transmitting wireless device to a receiving wireless device, and wherein the determining that the first sidelink communication has been successfully received comprises detecting an acknowledgement message transmitted from the receiving wireless device to the transmitting wireless device in response to the first sidelink communication, wherein the second sidelink communication is performed on the at least one of the one or more second resources in response to the detecting the acknowledgement message.

Aspect 27. The method of aspect 26, wherein the first resource is a physical sidelink shared channel (PSSCH) resource on which the first sidelink communication is received, and wherein the acknowledgement message is transmitted on a physical sidelink feedback channel (PSFCH) resource.

Aspect 28. The method of any of aspects 17 through 27, further comprising: transmitting the second sidelink communication on at least one of the one or more second resources.

Aspect 29: A wireless device comprising: a transceiver configured to communicate with a radio access network, a memory, and a processor communicatively coupled to the transceiver and the memory, wherein the processor and the memory are configured to perform any one of aspects 16 through 28.

Aspect 30: A wireless device configured for wireless communication comprising at least one means for performing any one of aspects 16 through 28.

Aspect 31: An article of manufacture for use by a wireless device in a wireless communication network, the article comprising: a non-transitory computer-readable medium having stored therein instructions executable by one or more processors of the wireless device to perform any one of aspects 16 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by a first wireless device, comprising:
    reserving a first resource for a sidelink communication and one or more second resources for one or more retransmissions, respectively, of the sidelink communication;
    transmitting the sidelink communication using the first resource;
    identifying a release indication resource of a plurality of release indication resources that corresponds to the first resource; and
    transmitting on the identified release indication resource, to a second wireless device, a release indication indicating that the one or more second resources are available in response to determining to release the one or more second resources.

2. The method of claim 1, further comprising at least one of:
    releasing the one or more second resources in response to receiving an acknowledgement message for the sidelink communication; or
    releasing the one or more second resources in response to receiving a priority indication indicating that another wireless device has reserved the one or more second resources for a communication with a higher priority than the sidelink communication.

3. The method of claim 2, wherein the release indication includes at least one of:
    an indication that the one or more second resources are released;
    a source identifier associated with the first wireless device releasing the one or more second resources;
    one or more triggers for releasing the one or more second resources, the one or more triggers indicating at least one of the acknowledgement message or the priority indication; and
    an indication indicating that the one or more second resources being released is for a periodic reservation, or for an aperiodic reservation, or for both the periodic reservation and the aperiodic reservation.

4. The method of claim 1, further comprising:
    determining a channel congestion level associated with a plurality of resources for the wireless communication;
    releasing the one or more second resources to transmit the release indication when the channel congestion level is greater than a first congestion threshold; and
    refraining from releasing the one or more second resources to refrain from transmitting the release indication when the channel congestion level is less than or equal to a second congestion threshold.

5. The method of claim 4, wherein the first congestion threshold is the same as the second congestion threshold.

6. The method of claim 4, further comprising:
    randomly selecting between the releasing the one or more second resources and the refraining from releasing the one or more second resources when the channel congestion level is greater than the second congestion threshold and less than or equal to the first congestion threshold.

7. The method of claim 4, wherein the channel congestion level is a channel busy ratio (CBR).

8. The method of claim 1, wherein the first resource is a physical sidelink shared channel (PSSCH) resource on which the sidelink communication is transmitted, and
    wherein the identifying the release indication resource comprises:
    identifying the release indication resource of the plurality of release indication resources that corresponds to the PSSCH resource.

9. The method of claim 1, wherein the release indication resource is associated with at least one of a source identifier of the first wireless device or one or more destination identifiers of the second wireless device.

10. The method of claim 1, further comprising:
    identifying a physical sidelink control channel (PSCCH) resource that is associated with the sidelink communication,
    wherein the identifying the release indication resource comprises:
    identifying the release indication resource of the plurality of release indication resources that corresponds to the PSCCH resource.

11. The method of claim 1, further comprising:
    transmitting a sidelink grant in sidelink control information, the sidelink grant indicating that the one or more second resources are reserved by the first wireless device,
    wherein the release indication indicates that the one or more second resources indicated by the sidelink grant are available.

12. The first wireless device of claim 1, wherein the at least one processor is further configured to perform at least one of:
    releasing the one or more second resources in response to receiving an acknowledgement message for the sidelink communication; or
    releasing the one or more second resources in response to receiving a priority indication indicating that another wireless device has reserved the one or more second resources for a communication with a higher priority than the sidelink communication.

13. The first wireless device of claim 1, wherein the at least one processor is further configured to:

determine a channel congestion level associated with a plurality of resources for the wireless communication;

release the one or more second resources to transmit the release indication when the channel congestion level is greater than a first congestion threshold; and refrain from releasing the one or more second resources to refrain from transmitting the release indication when the channel congestion level is less than or equal to a second congestion threshold.

14. The first wireless device of claim 1, wherein the first resource is a physical sidelink shared channel (PSSCH) resource on which the sidelink communication is transmitted, and wherein the at least one processor configured to identify the release indication resource is configured to:

identify the release indication resource of the plurality of release indication resources that corresponds to the PSSCH resource.

15. A first wireless device for wireless communication, comprising:

at least one processor;

a transceiver communicatively coupled to the at least one processor; and a memory communicatively coupled to the at least one processor, wherein the at least one processor is configured to:

reserve a first resource for a sidelink communication and one or more second resources for one or more retransmissions, respectively, of the sidelink communication, transmit the sidelink communication using the first resource, identifying a release indication resource of a plurality of release indication resources that corresponds to the first resource, and transmit on the identified release indication resource, to a second wireless device, a release indication indicating that the one or more second resources are available in response to determining to release the one or more second resources.

16. A method of wireless communication by a wireless device, comprising:

receiving a first sidelink communication from a transmitting wireless device on a first resource;

identifying one or more second resources reserved respectively for one or more retransmissions of the first sidelink communication;

determining that the one or more second resources are available for a second sidelink communication based on:

receiving, from the transmitting wireless device, a release indication indicating that the second resource are available, on a release indication resource of a plurality of release indication resources that corresponds to the first resource; and reporting the one or more second resources to a higher layer within the wireless device for resource selection in response to the determination that the one or more second resources are available for a second sidelink communication.

17. The method of claim 16, further comprising at least one of:

transmitting, to the transmitting wireless device, an acknowledgement message based on the determining that the first sidelink communication has been successfully received; or transmitting, to the transmitting wireless device, a priority indication indicating that the wireless device has reserved the one or more second resources for the second sidelink communication with a higher priority than the first sidelink communication, wherein the release indication is received in response to at least one of the transmitting the acknowledgement message or the transmitting the priority indication.

18. The method of claim 17, wherein the release indication includes at least one of:

an indication that the one or more second resources are released;

a source identifier associated with the wireless device releasing the one or more second resources;

one or more triggers respectively for releasing the one or more second resources, each of the one or more triggers indicating at least one of the acknowledgement message or the priority indication; and an indication indicating that the one or more second resources being released is for a periodic reservation, or for an aperiodic reservation, or for both the periodic reservation and the aperiodic reservation.

19. The method of claim 16, further comprising:

determining a channel congestion level associated with a plurality of resources for the wireless communication;

monitoring for the release indication when the channel congestion level is greater than a congestion threshold; and refraining from monitoring for the release indication when the channel congestion level is less than or equal to the congestion threshold.

20. The method of claim 16, wherein the first resource is a physical sidelink shared channel (PSSCH) resource on which the first sidelink communication is received, and wherein the release indication is transmitted on the release indication resource of the plurality of release indication resources that corresponds to the PSSCH resource.

21. The method of claim 20, wherein the release indication resource is associated with at least one of a source identifier of the transmitting wireless device or a destination identifier of the wireless device.

22. The method of claim 16, wherein the release indication is transmitted on the release indication resource of the plurality of release indication resources that corresponds to a physical sidelink control channel (PSCCH) resource associated with the first sidelink communication.

23. The method of claim 16, further comprising:

receiving a sidelink grant in sidelink control information, the sidelink grant indicating that the one or more second resources are reserved by the transmitting wireless device, wherein the release indication indicates that the one or more second resources indicated by the sidelink grant are available.

24. The method of claim 16, further comprising:

monitoring for a sidelink grant indicating the one or more second resources reserved;

monitoring for the release indication associated with the one or more second resources indicated by the sidelink grant; and determining that the one or more second resources are available based on the release indication.

25. The method of claim 16, wherein the receiving the first sidelink communication comprises monitoring for the first sidelink communication transmitted from a transmitting wireless device to a receiving wireless device, and wherein the determining that the first sidelink communication has been successfully received comprises detecting an acknowledgement message transmitted from the receiving wireless device to the transmitting wireless device in response to the first sidelink communication, wherein the second sidelink communication is performed on the at least one of the one or more second resources in response to the detecting the acknowledgement message.

26. The method of claim 25, wherein the first resource is a physical sidelink shared channel (PSSCH) resource on which the first sidelink communication is received, and wherein the acknowledgement message is transmitted on a physical sidelink feedback channel (PSFCH) resource.

27. A wireless device for wireless communication, comprising:

at least one processor;

a transceiver communicatively coupled to the at least one processor; and a memory communicatively coupled to the at least one processor, wherein the at least one processor is configured to:

receive a first sidelink communication from a transmitting wireless device on a first resource, identify one or more second resources reserved respectively for one or more retransmissions of the first sidelink communication, determine that the one or more second resources are available for a second sidelink communication based on:

receiving, from the transmitting wireless device, a release indication indicating that the second resource are available, on a release indication resource of a plurality of release indication resources that corresponds to the first resource, and report the one or more second resources to a higher layer within the wireless device for resource selection in response to the determination that the one or more second resources are available for a second sidelink communication.

28. The wireless device of claim 27, wherein the at least one processor is further configured to perform at least one of:

transmitting, to the transmitting wireless device, an acknowledgement message based on the determining that the first sidelink communication has been successfully received; or transmitting, to the transmitting wireless device, a priority indication indicating that the wireless device has reserved the one or more second resources for the second sidelink communication with a higher priority than the first sidelink communication, wherein the release indication is received in response to at least one of the transmitting the acknowledgement message or the transmitting the priority indication.

* * * * *